(12) United States Patent
Kertesz et al.

(10) Patent No.: US 9,945,705 B2
(45) Date of Patent: Apr. 17, 2018

(54) FLOW IMAGING AND MONITORING FOR SYNCHRONIZED MANAGEMENT OF WIDE AREA DRAINAGE

(71) Applicants: U.S. Environmental Protection Agency, Washington, DC (US); Urbanalta Corp, Cincinnati, OH (US)

(72) Inventors: Ruben Kertesz, Cincinnati, OH (US); Daniel J. Murray, Jr., Cincinnati, OH (US); Michael Bolan, Cincinnati, OH (US); Ryan Anderson, Cincinnati, OH (US); Chunsheng Fang, Redwood City, CA (US)

(73) Assignee: U.S. Environmental Protection Agency, Washington, DC (US)

( * ) Notice: Subject to any disclaimer, the term of this patent is extended or adjusted under 35 U.S.C. 154(b) by 0 days.

(21) Appl. No.: 15/365,264

(22) Filed: Nov. 30, 2016

(65) Prior Publication Data

US 2017/0082470 A1    Mar. 23, 2017

Related U.S. Application Data

(63) Continuation of application No. 14/281,757, filed on May 19, 2014, now Pat. No. 9,541,432.
(Continued)

(51) Int. Cl.
  *G01F 1/20* (2006.01)
  *G01F 1/66* (2006.01)
(Continued)

(52) U.S. Cl.
CPC ............... *G01F 1/662* (2013.01); *E03F 7/00* (2013.01); *F16M 13/02* (2013.01); *G01F 1/002* (2013.01);
(Continued)

(58) Field of Classification Search
CPC . G01F 1/66; G01F 1/661; G01F 1/662; G01F 1/666; E03F 7/00; E03F 2201/20;
(Continued)

(56) References Cited

U.S. PATENT DOCUMENTS 6,082,193 A    7/2000 Paulson ..................... 73/152.58
6,263,747 B1   7/2001 Carson ........................ 73/866.5
(Continued)

OTHER PUBLICATIONS

8ioNomicServices. "Acoustic Sewer Inspection". Published Sep. 10, 2012, YouTube.com <https://www.youtube.com/watch?v=LI-yk_pPpmw> [VIDEO] [Accessed Aug. 25, 2016].
(Continued)

*Primary Examiner* — Jonathan Dunlap
(74) *Attorney, Agent, or Firm* — Stein IP, LLC; Mark Sullivan

(57) ABSTRACT

A flow imaging and monitoring system for synchronized management of wide area drainage that includes an interposer for supporting monitoring and management equipment in a manhole, a module for illuminating water flowing in pipes at the base of the manhole, a module for monitoring responses to reflected light, a sealed and rechargeable battery pack, and a data analysis and management system to interpret data streams in real time. The interposer can be adjusted to fit the diameter of the manhole and can be adjusted to be placed under the manhole cover. The module for illuminating the flowing water can be adjusted to generate various frequencies. The support structures for the modules can be adjusted for varying pitch, roll and yaw with respect to the manhole. The data analysis and management system is supported by cloud computing.

19 Claims, 40 Drawing Sheets

Related U.S. Application Data

(60) Provisional application No. 61/855,515, filed on May 17, 2013.

(51) Int. Cl.
| | | |
|---|---|---|
| *H01M 10/42* | (2006.01) | |
| *F16M 13/02* | (2006.01) | |
| *E03F 7/00* | (2006.01) | |
| *H01M 2/10* | (2006.01) | |
| *G01F 1/00* | (2006.01) | |
| *G01F 1/704* | (2006.01) | |
| *G01F 1/708* | (2006.01) | |

(52) U.S. Cl.
CPC .............. *G01F 1/661* (2013.01); *G01F 1/666* (2013.01); *G01F 1/704* (2013.01); *H01M 2/1022* (2013.01); *H01M 10/4257* (2013.01); *E03F 2201/20* (2013.01); *E03F 2201/40* (2013.01); *G01F 1/66* (2013.01); *G01F 1/7086* (2013.01); *H01M 2010/4271* (2013.01); *Y10T 137/8158* (2015.04); *Y10T 137/8359* (2015.04)

(58) Field of Classification Search
CPC ........... E03F 2201/40; Y10T 137/8158; Y10T 137/8359; H01M 10/4257; F16M 13/02
USPC ..... 73/861.18, 861.25–861.28, 49.1, 40.5 A, 73/592; 404/25, 26; 137/551; 340/603, 340/606; 702/54
See application file for complete search history.

(56) References Cited

U.S. PATENT DOCUMENTS

| | | | |
|---|---|---|---|
| 6,453,247 B1 | 9/2002 | Hunaidi | 702/51 |
| 7,266,992 B2 | 9/2007 | Shamout | 73/40.5 A |
| 7,830,273 B2 | 11/2010 | Twitchell, Jr. | 340/854.5 |
| 8,215,183 B2* | 7/2012 | Petroff | G01F 1/662 73/861.28 |
| 8,220,484 B2 | 7/2012 | Howitt | 137/551 |
| 8,823,509 B2 | 9/2014 | Hyland | 340/539.1 |
| 8,931,505 B2 | 1/2015 | Hyland | 137/296 |
| 9,228,867 B2 | 1/2016 | Clarke | |
| 2004/0035190 A1* | 2/2004 | Sinha | G01N 29/036 73/61.49 |
| 2005/0145018 A1 | 7/2005 | Sabata | 73/49.1 |
| 2005/0210960 A1* | 9/2005 | Shamout | G01M 3/243 73/40.5 A |
| 2007/0041333 A1 | 2/2007 | Twitchell, Jr. | 370/252 |
| 2007/0103324 A1 | 5/2007 | Kosuge | 340/618 |
| 2008/0155064 A1 | 6/2008 | Kosuge | 709/219 |
| 2009/0250125 A1 | 10/2009 | Howitt | 137/551 |
| 2011/0000311 A1* | 1/2011 | Petroff | G01F 1/662 73/861.28 |
| 2011/0239781 A1* | 10/2011 | Petroff | G01F 1/002 73/861.28 |
| 2012/0051186 A1 | 3/2012 | Holley | 367/131 |
| 2013/0211797 A1 | 8/2013 | Scolnicov | 703/2 |
| 2014/0260626 A1* | 9/2014 | Kulczyk | B64D 37/32 73/592 |
| 2014/0311245 A1* | 10/2014 | Horoshenkov | G01N 29/11 73/592 |
| 2015/0362465 A1* | 12/2015 | Martin | G01N 29/11 73/592 |
| 2016/0208952 A1 | 7/2016 | Howitt | |

OTHER PUBLICATIONS

Teledyne Laboratory and Field Instruments. "LaserFlow—A New Paradigm in Open Channel Flow Measurement". Published Dec. 6, 2012, YouTube.com. <https://www.youtube.com/watch?v=ILiXTCnth1 O> [VIDEO] [Accessed Aug. 25, 2016].

* cited by examiner

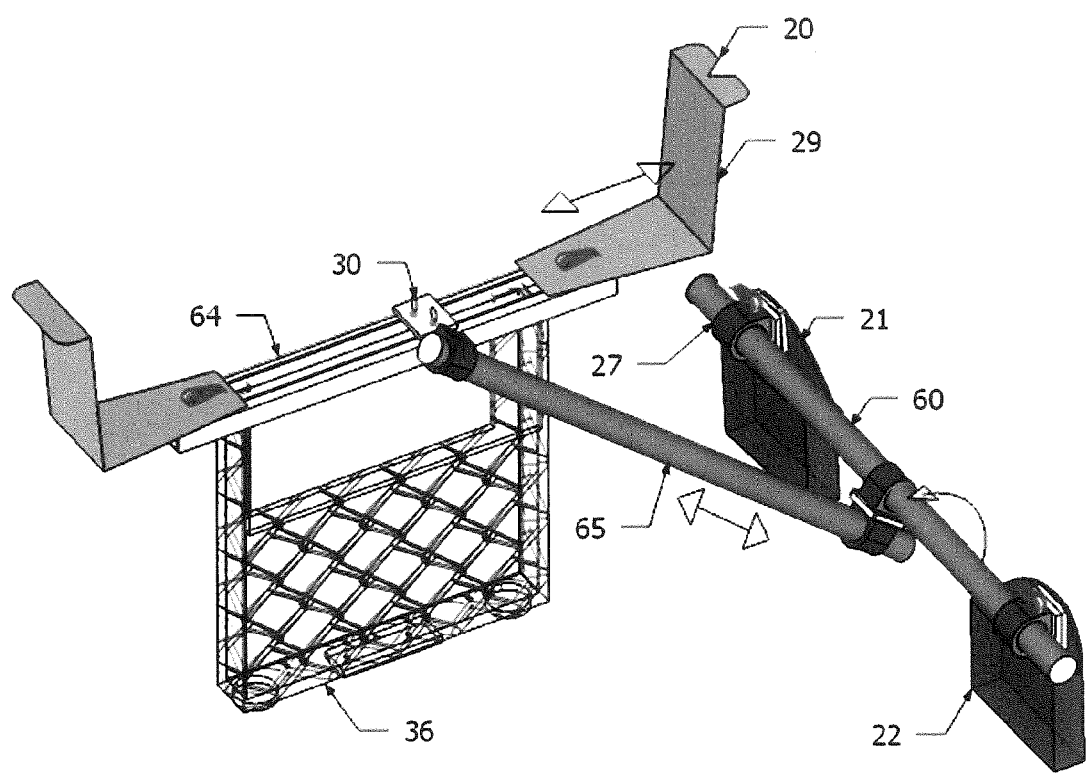

FWS battery pack charge/ discharge cycle

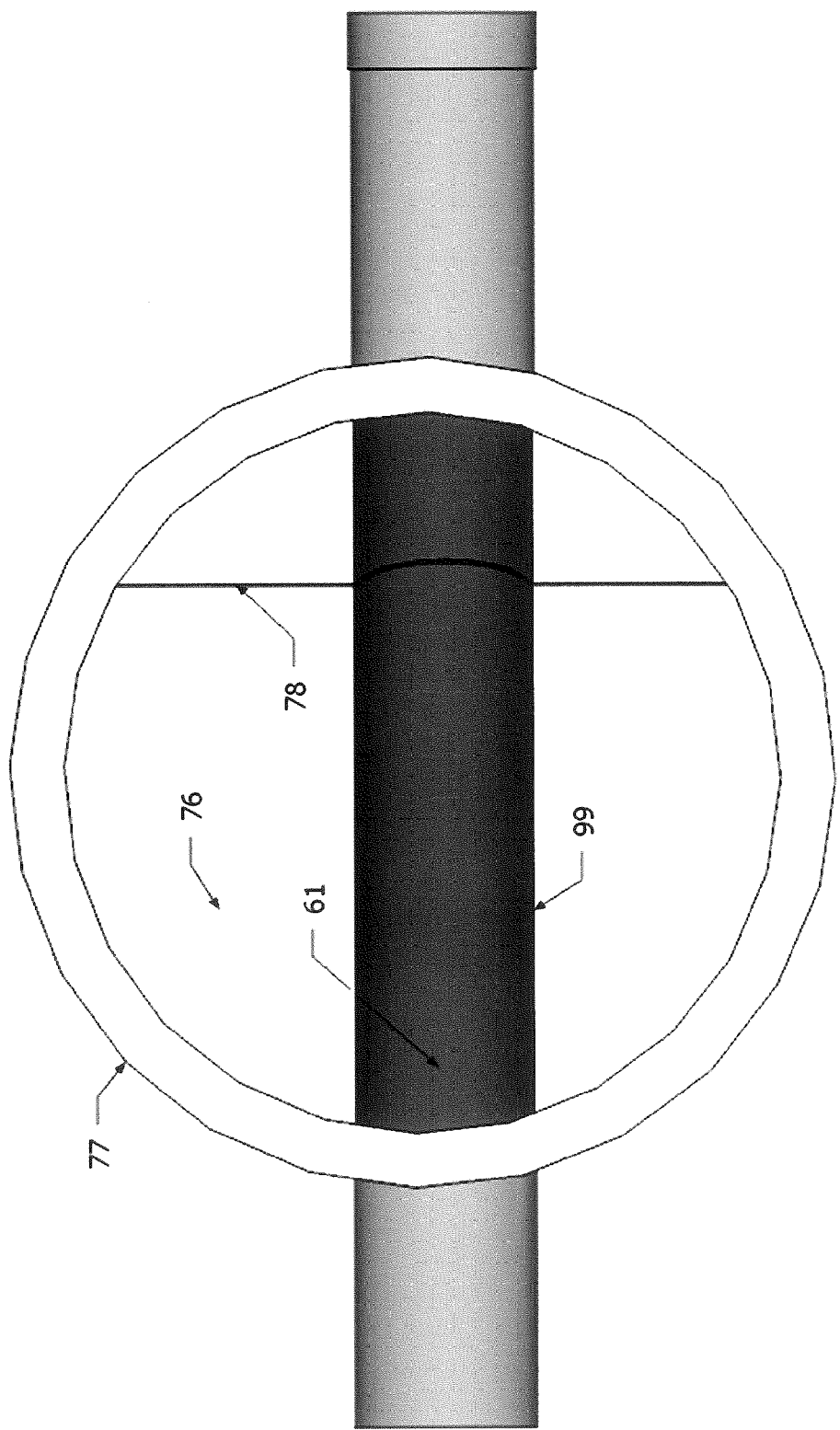

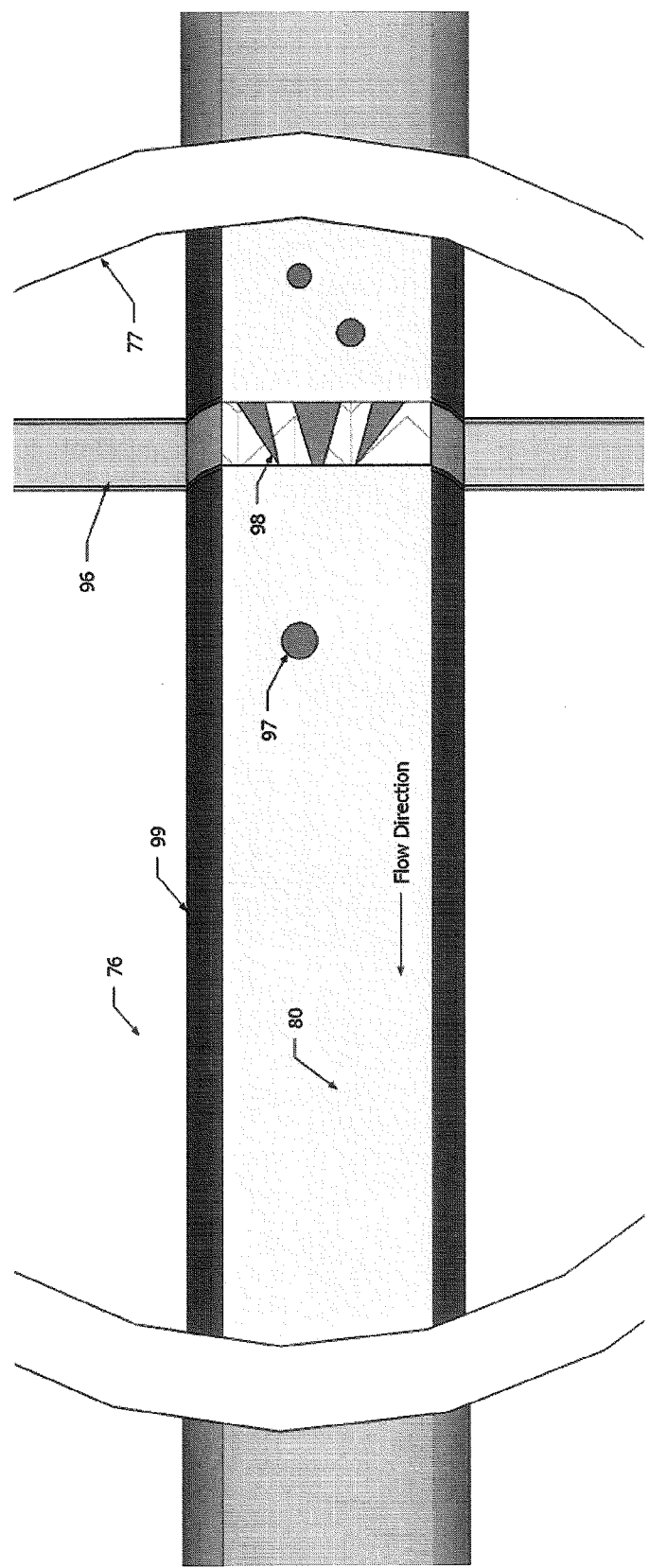

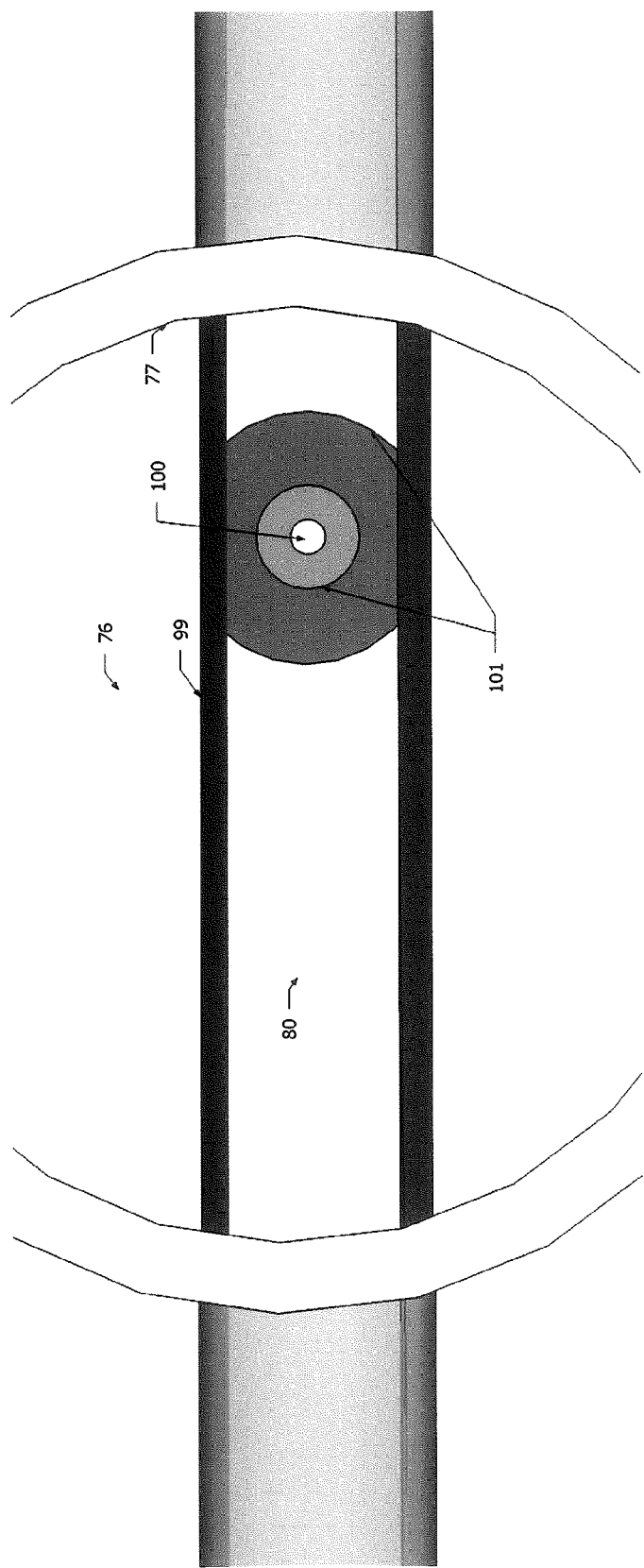

Image width: 1280 pixels    Image height: 720 pixels

User Drawn Line length(in pixels): 417.0047961354881 pixels
User Drawn Flow Rate: 3.471483446194824

Selected Line length(in pixels): 447

[ Altavision Line #0 ▼ ]   [ Reprocess Image ]

[ save flow ]   [ Invert Line Color ]

FLOW IMAGING AND MONITORING FOR SYNCHRONIZED MANAGEMENT OF WIDE AREA DRAINAGE

CROSS-REFERENCE TO RELATED APPLICATIONS

This application is a continuation of U.S. application Ser. No. 14/281,757, filed May 19, 2014, which claims the benefit of priority to U.S. Provisional Application No. 61/855,515, filed May 17, 2013, in the U.S. Patent and Trademark Office. All disclosures of the Provisional Application are incorporated herein in their entireties by reference.

BACKGROUND OF THE INVENTION

1. Field of the Invention

Aspects of the present invention provide an adjustable interposer that fits under a manhole cover. A flowing water scope consists of an interposer and modules attached to the interposer for power, lighting, imaging, onsite computation and communication. The flowing water scope provides quantification and visualization of water flow and detection of water constituents. Capabilities can be extended using accessories that communicate with the flowing water scope. Monitored parameters and wastewater flow imagery are transmitted to the cloud for synchronized management of wide area drainage.

2. Description of the Related Art

Water flow measurement is a foundational component of environmental protection and is key to understanding of how the dynamics of flows affects water quality. Aspects of the present invention can greatly enhance the capability of water/wastewater/stormwater utilities to monitor, manage, and control their conveyance networks/systems, therefore improving public health and the environment.

Current flow measurement methods involve decentralized, standalone equipment with extremely challenging networking capability. The methods are costly, potentially dangerous because human entry is required for installation and maintenance, consume large battery cells that need frequent replacement, are not adept at measuring low flows, and are subject to removal from monitoring sites to calibrate equipment. That is, there has been a lack of available flow monitoring systems that are easily and safely deployed, reliable, accurate, self-calibrating, centrally managed, and cost-effective.

Existing pipe flow measurement products involve some form of area-velocity flow measurement by means of cabled, submerged sensors installed in the flow stream with a separate logger/battery box located near the top of the manhole. The standard features of these units include pressure and/or ultrasonic sensors for level measurement and sonic Doppler waves propagated within the stream for measurement of velocity. The sensors are cumbersome and dangerous to install, requiring the installer to enter the sewer pipe, which is a confined space entry. The sensors are most commonly mounted in the sewer pipe using expansion rings that are subject to being dislodged, particularly if debris catches the cable connecting the sensor(s) to the logger/power source. Most units have no network connectivity, requiring time consuming in-person data retrieval. There is no way of visually observing sewer conditions without being physically present at the site such that frequent clogging is difficult to identify. Other drawbacks include laborious calibration; difficult and dangerous installation; no method of updating the sensor/logger system while deployed; manual configuration and adjustment of embedded software; erroneous readings that are associated with incorrect user input (e.g. for pipe dimensions) during configuration; sensors that can be fouled and damaged because of challenging placement in the stream; and challenging networking set up, requiring highly customized centralized software configurations.

SUMMARY OF THE INVENTION

An aspect of the present invention provides an interposer that can be adjusted to fit the diameter of the inner ring of a manhole rim and adjusted to fit under, but free from the manhole cover.

Another aspect of the present invention provides modules mounted on the interposer for lighting, water quality detection, power, and connections to the cloud through a communications chip and antenna or through an external computer or smartphone.

Another aspect of the present invention provides a sealed, rechargeable battery pack to power the modules where there are no voltages exposed until power is needed and cell banks can be isolated until recharge without affecting performance of the remaining cell banks.

Another aspect of the present invention provides algorithms for extraction of data when combined with various lighting conditions.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 1A through 1F illustrate various views of the interposer and modules of the present invention;

FIGS. 19A through 19C are diagrams illustrating determination of flow direction and velocity using a thick line;

FIG. 20B illustrates the effect of the transmitted beam on the water surface;

DETAILED DESCRIPTION OF THE EMBODIMENTS

Figure 1A:
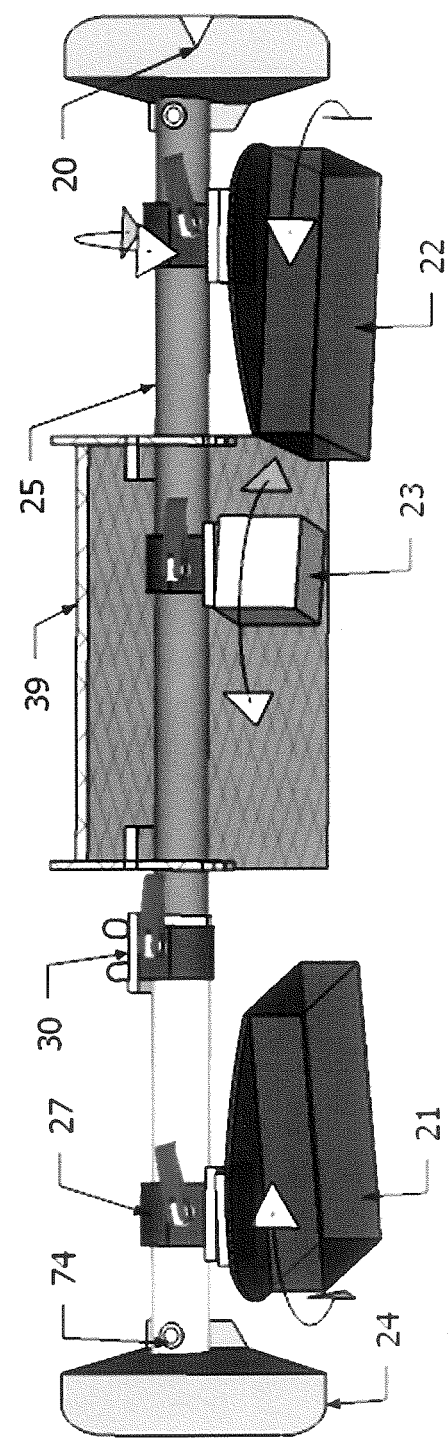

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Details of the Hardware of the Interposer

Figure 5:
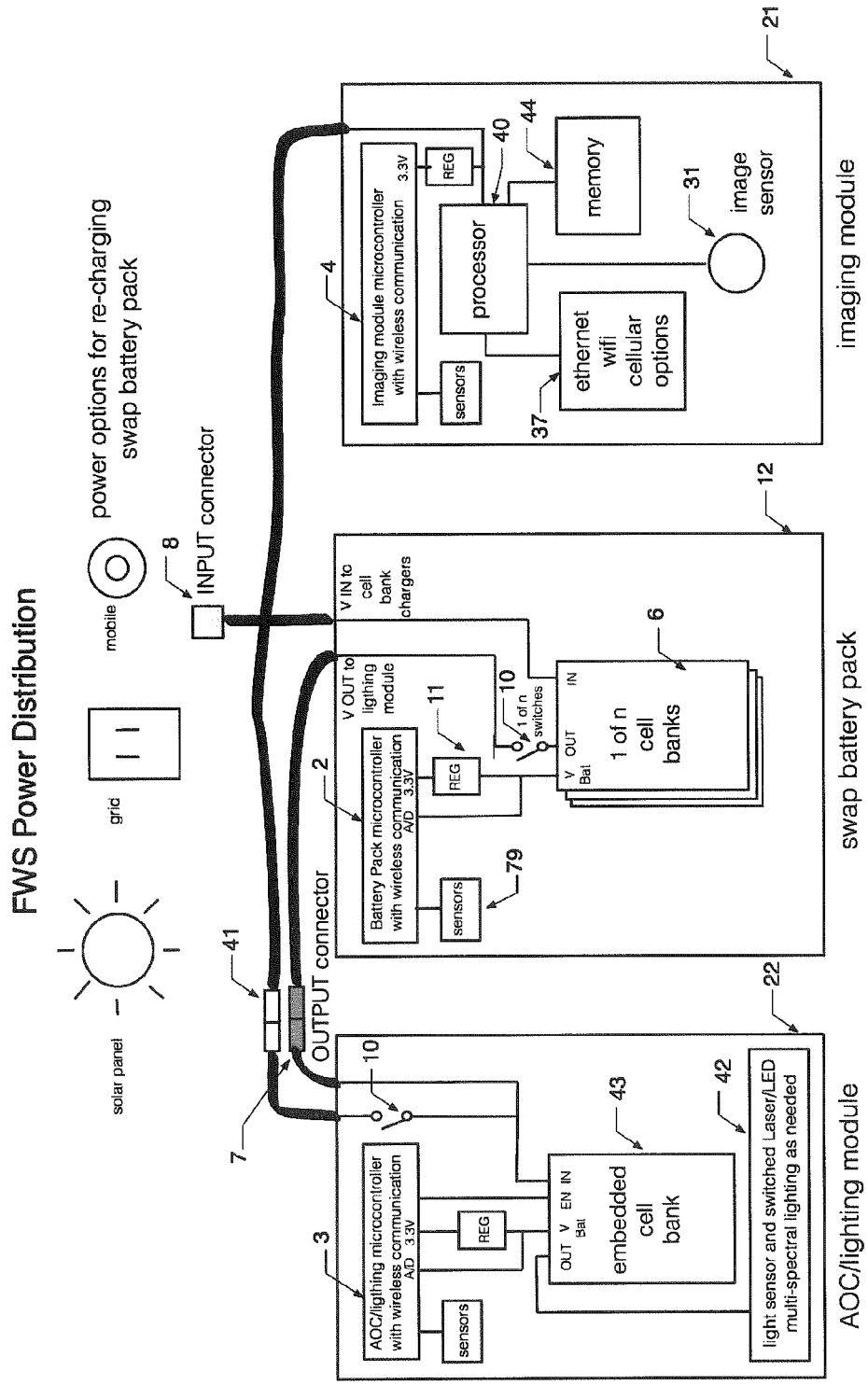
FIG. 5 is a block diagram of the FWS, including power supply, lighting and control componentry, and imaging, sensing, processing, and communication componentry.

As shown in FIGS. 1A-1F, an Interposer™ of the present invention includes brackets (24) that can be swapped out to match an appropriate depth beneath a sewer lid, a device to adjust fit of the interposer to the diameter of the inner ring of the manhole rim, a device for containing and supporting a battery (36, 39), clamps (27, 35) to attach enclosures (21, 22) and an accessory device (23) while allowing for manipulation in multiple planes; and drop protection (30). A system to be defined as a Flowing Water Scope™ (FWS™) includes the interposer, electronics and communications equipment contained in (21) and (22) or (28), and batteries and electrical connections as shown in FIG. 5, discussed later.

Embodiments of the Interposer

Various embodiments of the interposer of the present invention are as follows. FIG. 1A (tubular interposer bar with FWS componentry) may be one embodiment. This embodiment includes splayed bracketry (24) with a bar end lug (74), adjustable length (telescoping) tubing (25), a rigid battery holster (39), clamps (27) to attach a lighting enclosure (22), an imaging enclosure (21), and accessory devices (23). A clamp is used for drop protection (30, with included eyelets) and can also double as an immobilizing clamp to fix the bar length and prevent unwanted rotation. For purposes of the present invention, adjustable length tubing includes a tube within a tube or a bar within a tube or other techniques that provide for adjustment of the length. The telescoping tubing (25) can be a tube within a tube or a bar within a tube.

A lock mechanism for tubular design (27) accommodates various diameter manholes. The brackets (24) are splayed to provide snug fits against the vertical plane of the inner ring of the manhole. A wide lip of the bracket (24) provides stability in the horizontal plane. In this embodiment (FIG. 1A), the brackets (24) are designed to offset the tubing (25) and attached equipment for freedom of movement about the centerline of the inner ring. The brackets (24) are designed to be replaceable to allow for the interposer to be located at required depths beneath the manhole lid (reference number 70, FIG. 2C). Locking devices (74) prevent separation of the bracket (24) and tube (25).

Three degrees of freedom are provided in this design: Yaw is provided by rotating the interposer around the centerpoint of the plane of the inner ring of the manhole (reference number 69, FIG. 2A). Roll (around the tube 25) is provided by axial rotation of the clamps (27) for an image enclosure (21), lighting enclosure (22), accessory device (23), and/or other clamps around the bar. Pitch is the vertical angle with respect to the central (longitudinal) axis of the bar if the bar is placed as shown in FIG. 2A and FIG. 2B. Pitch is provided by the clamp (27) where one plane (rotating plane) moves with respect to a stationary plane that is integral to the clamp (27). Translational adjustment is provided by longitudinal movement of the clamp (27) along the length of the tube (25). Although adjustments are described using manual manipulation, remote manipulation of one or more mentioned degrees of freedom can be provided by motorized (e.g. servo) movement internal to the enclosure (e.g., manhole cover) (63, FIG. 2C). Also, the image enclosure (21) and the lighting enclosure (22) contain optically clear windows or bottom panels to allow light to pass through while maintaining a sealed enclosure. Furthermore, somebody ordinarily skilled in the art can combine the lighting enclosure (22) and image enclosure (21) into one enclosure (examples shown in FIGS. 1E and 1F).

The clamp with eyelets (30) is designed to attach the FWS assembly to a manhole rung as well as attach a sealed battery (12) to the interposer, providing drop protection. The battery holster (39) securely holds the sealed battery (12) to the interposer. A battery holster 39 is designed to prevent moisture entrapment. Battery drop protection (in addition to leash protection provided by the clamp (30) can be further ensured using a latch or other manipulatable retention mechanism to hold the battery in place under any orientation of the interposer.

One of the brackets (24) is fitted with an alignment notch (20), to be aligned with a benchmark datum (FIG. 2A, reference number 72) on the manhole rim. This provides repeatable placement of the FWS. The embodiment shown is for placing the length of the interposer parallel to flow but the design can also be placed in another orientation, such as perpendicular to flow.

Accessory clamp (23) is designed to accommodate functions other than those provided in the image sensor or AOC/light enclosure(s), including but not limited to: air/gas sensor; exterior microphone; in-stream or ex-situ water quality sensor; or distance rangefinder (e.g. laser, ultrasonic). Accessory clamp 23 also includes the ability to optimize wireless signal emissions from the FWS by multiaxial adjustment of a directional antenna optionally affixed to the clamp. Additional accessory clamps (23) can be added as needed.

Alternative Embodiments of the Interposer

Figure 1B:
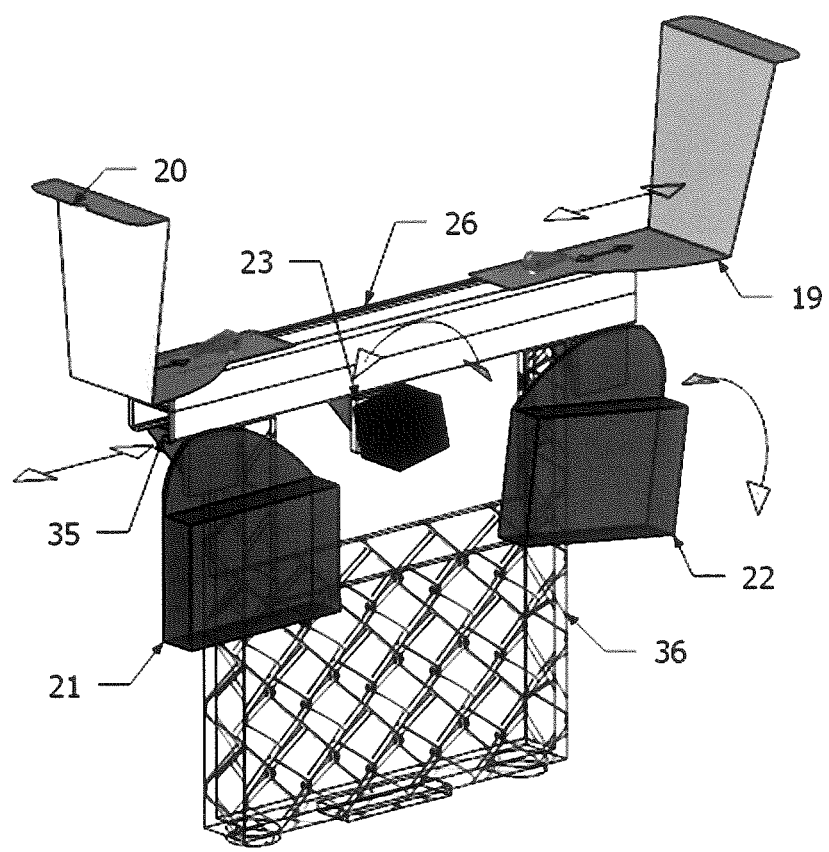

FIG. 1B is an embodiment of the interposer (and image enclosure 21 and lighting/AOC enclosure 22) where the horizontal bar is expressed as a double rail strut (26). Unlike FIG. 1A, the interposer here is fit to the diameter of the manhole not by extending the rail but by sliding an offset bracket with integrated strut plate (19) along a rail strut (26). In one embodiment, there are nominally approximately 10 inches of extension total allowed with this design. The strut clamps (35) here are unique from bar clamp 27 because they do not allow axial rotation about the longitudinal centerline of the tubing 25 bar like bar clamp 27 does for the tubing 25. In this embodiment, the sealed battery pack 12 is held to the interposer using a flexible battery sleeve (36).

Figure 2A:
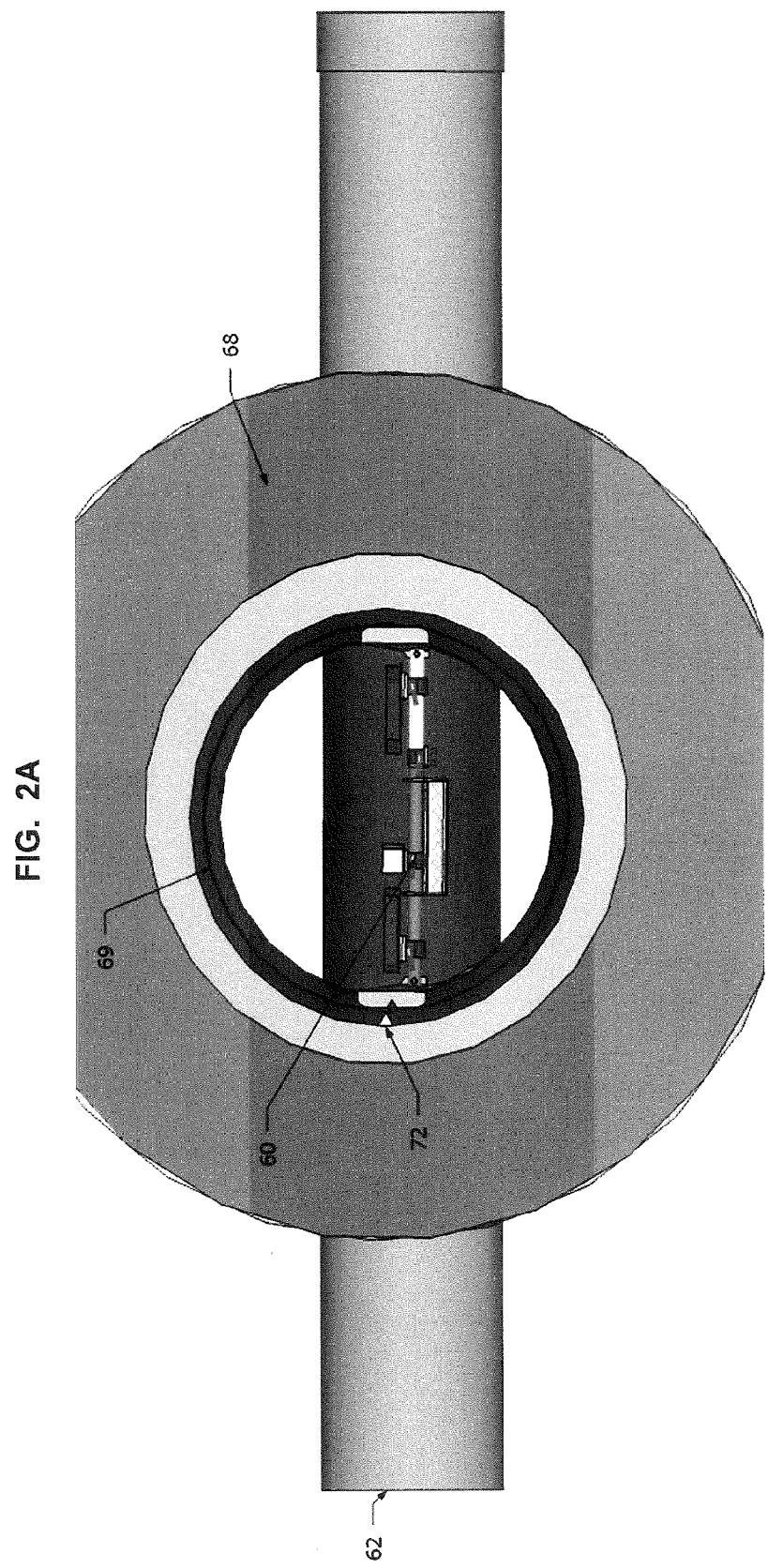
FIGS. 2A through 2C illustrate the interposer placed in a manhole.
Figure 2B:
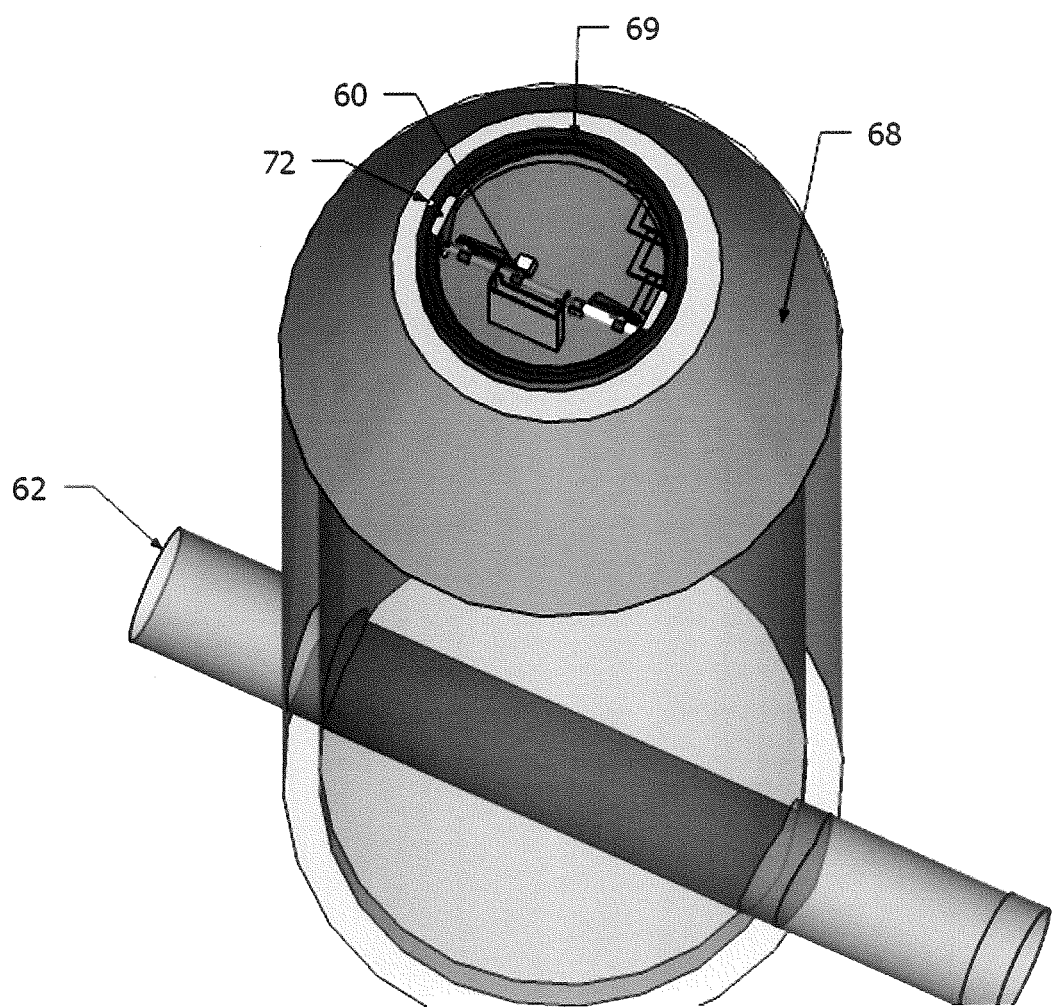
Figure 2C:
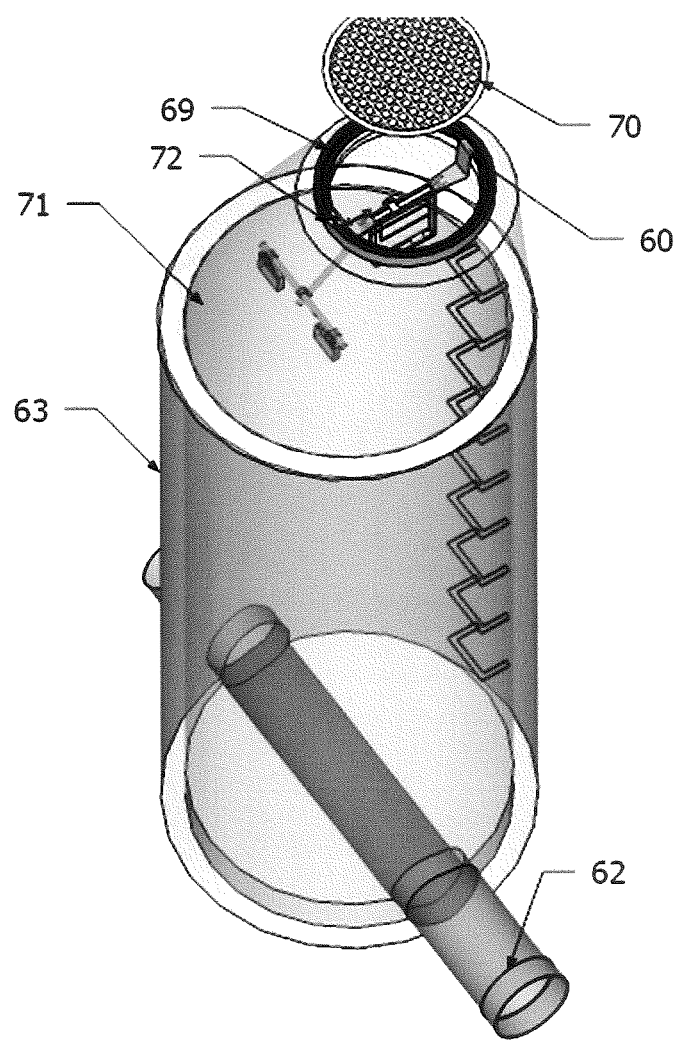

FIG. 1C is an embodiment of an interposer and attached enclosures designed for an offset manhole (see FIG. 2C). It allows the installer to maintain an orientation of the interposer (60) parallel to flow if so desired, however the equipment mounted on interposer (60) can alternatively be mounted on an eccentric or offset interposer extension rod 65 for orientation of the enclosures and accessories in the plane perpendicular to flow. The interposer (with image enclosure 21 and lighting/AOC enclosures 22) is shown in-situ in FIG. 1C. In FIG. 1C, the bracket (29) is not offset and the rail strut is single channel (64). Eccentric interposer extension rod 65 can be pulled towards single channel rail strut 64 at a fixed angle (nominally 45 degrees to the horizontal) to provide access to the attached componentry without lifting the bracket with strut plate 29, single rail strut 64, and drop protection 30 out of the manhole. This allows for easier adjustment. Furthermore, interposer (60) can be rotated with respect to eccentric interposer extension rod 65, providing an extra degree of manipulation not expressed in FIG. 1A.

Figure 1D:
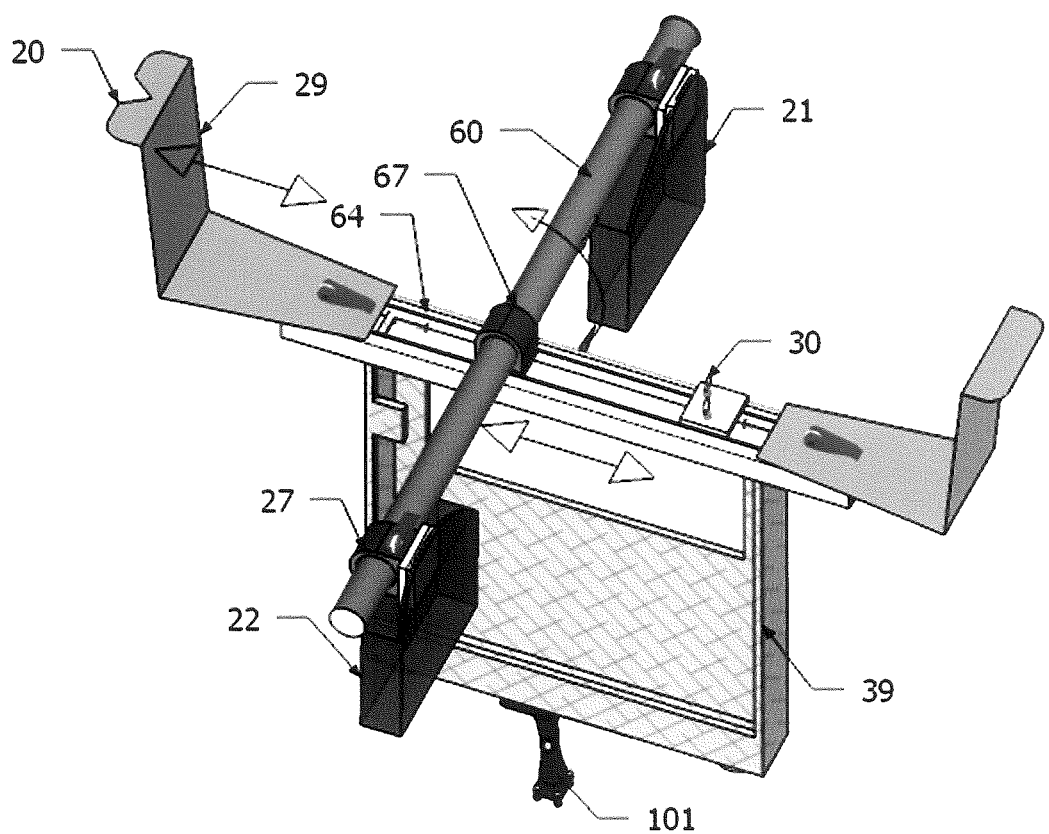

FIG. 1D is an embodiment of an interposer and attached enclosure that provides manipulation not possible in FIG. 1B, namely translation of interposer (60) in the plane of single channel rail strut 64, both parallel to the length of the channel rail strut 64 and perpendicular to the length of the single rail strut (64). A ball-joint accessory mount (101) is shown in this embodiment. Additionally, a retention tab is expressed in battery holster 39 to hold the a sealed battery pack 12 in place. This is designed to be rotated to allow for removal of the sealed battery pack 12. This design allows the channel rail strut 64 to be mounted perpendicular to the flow while maintaining orientation of the enclosed and attached devices parallel to the flow.

Figure 1E:
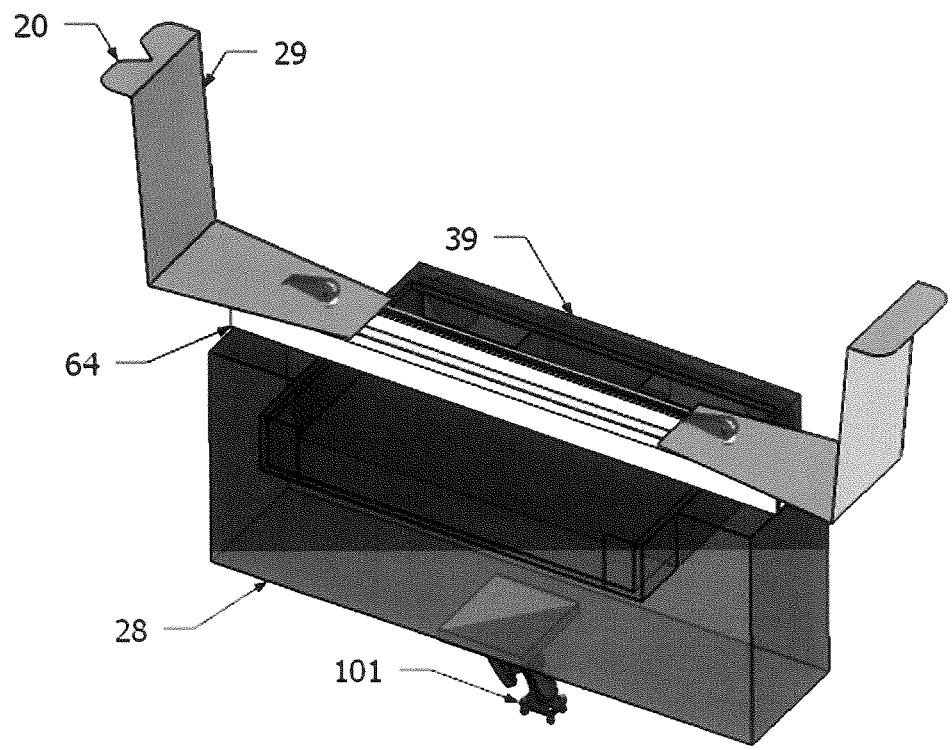

FIG. 1E is an embodiment of an interposer 60 and integrated battery holster 39 and enclosure designed for fully remotely controllable orientation of lighting and imaging componentry within an enclosure (28). This includes pitch, roll (akin to pan and tilt in servo terminology), and translation within the enclosure 28. The sealed battery pack 12 designed to be installed in a flat orientation. Shown is a mount for optional accessories (101). This mount 101 may be removed.

Figure 1F:
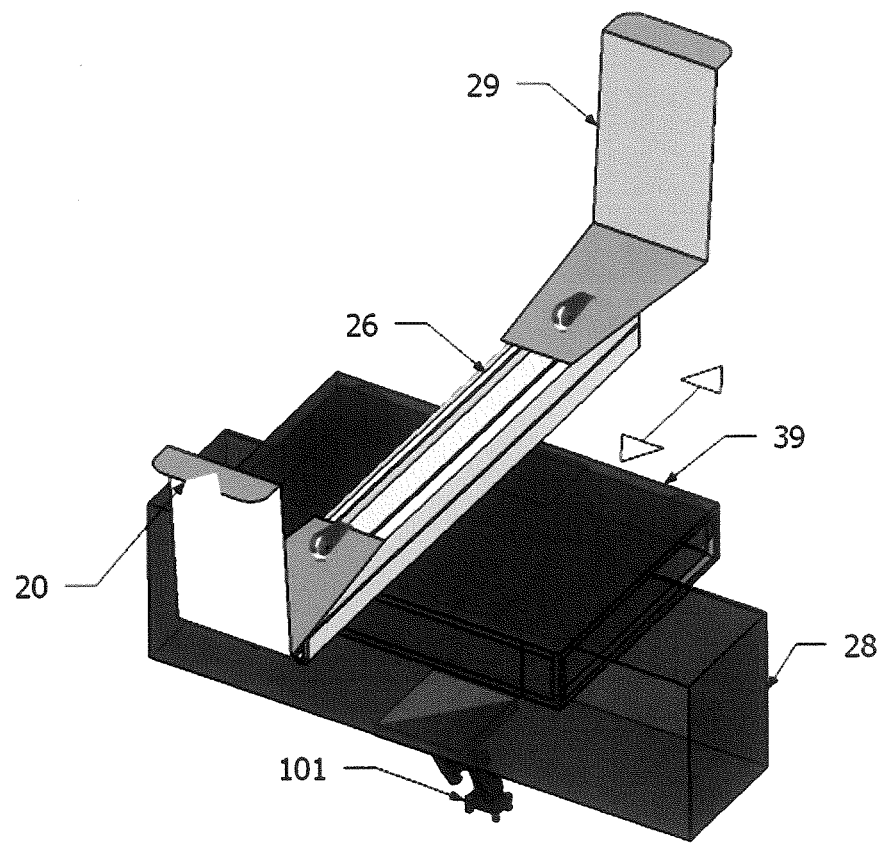

FIG. 1F is an embodiment similar to FIG. 1E but oriented perpendicular to the interposer 60. It is designed for orientation in the manhole similar to FIG. 1D. This allows for simpler mechanical componentry to be used in the single enclosure. For example, roll manipulation (servo pan) can be removed if translation along the length of double axle rail strut (26) is satisfactory for deployment.

Note that while some designs express the use of struts, other tubular pipes, and other designs that include combinations of both, the designs shown are robust enough to allow expressions with either or both systems. Also note that while enclosures, accessories, and attachment eyelets are shown to be fixed using compression via a cam, they may be fixed with nuts, bolts, rivets, or other methods.

Figure 3:
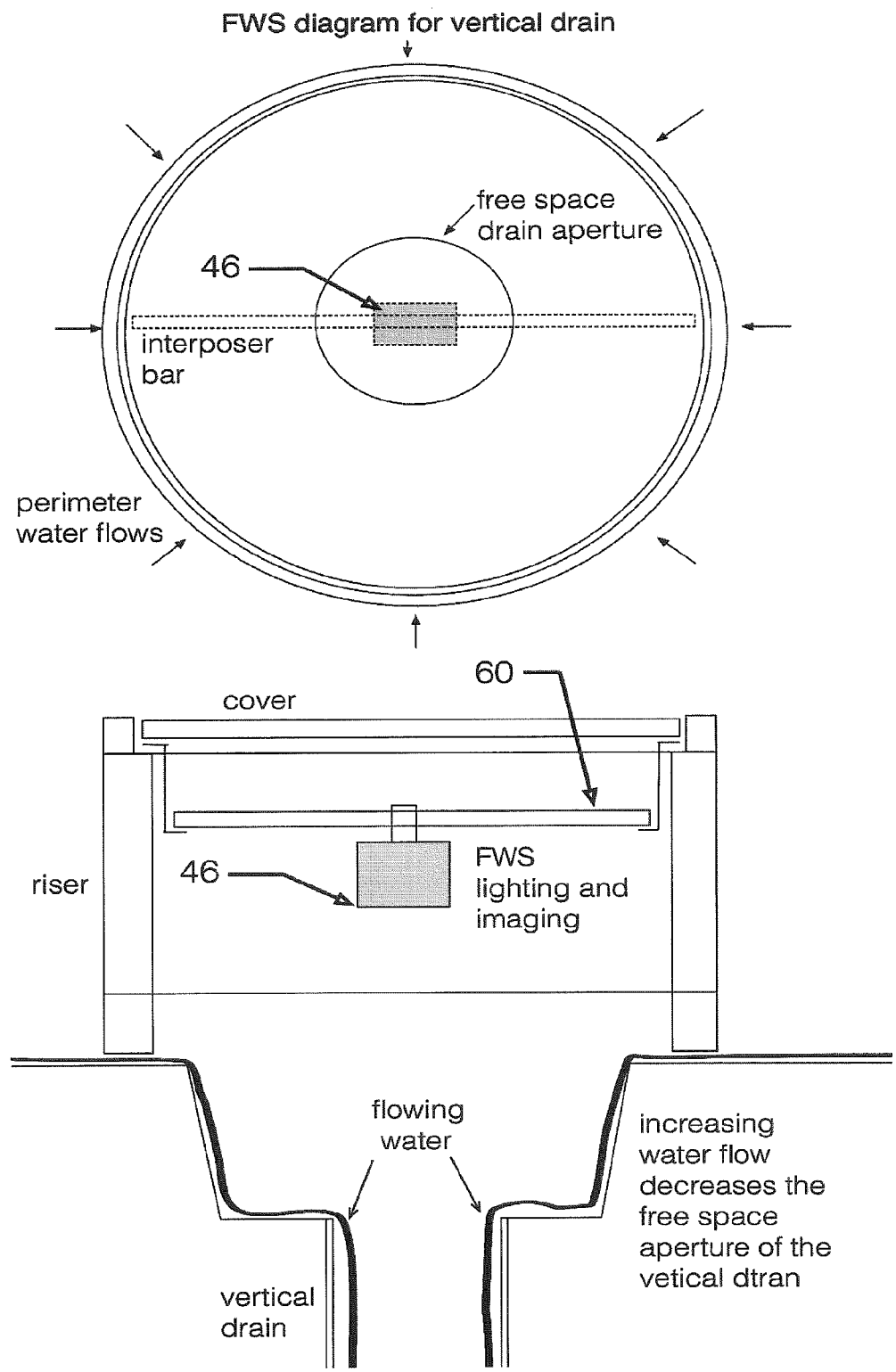
FIG. 3 is a diagram of a flowing water scope (FWS) for a vertical drain.
Figure 4:
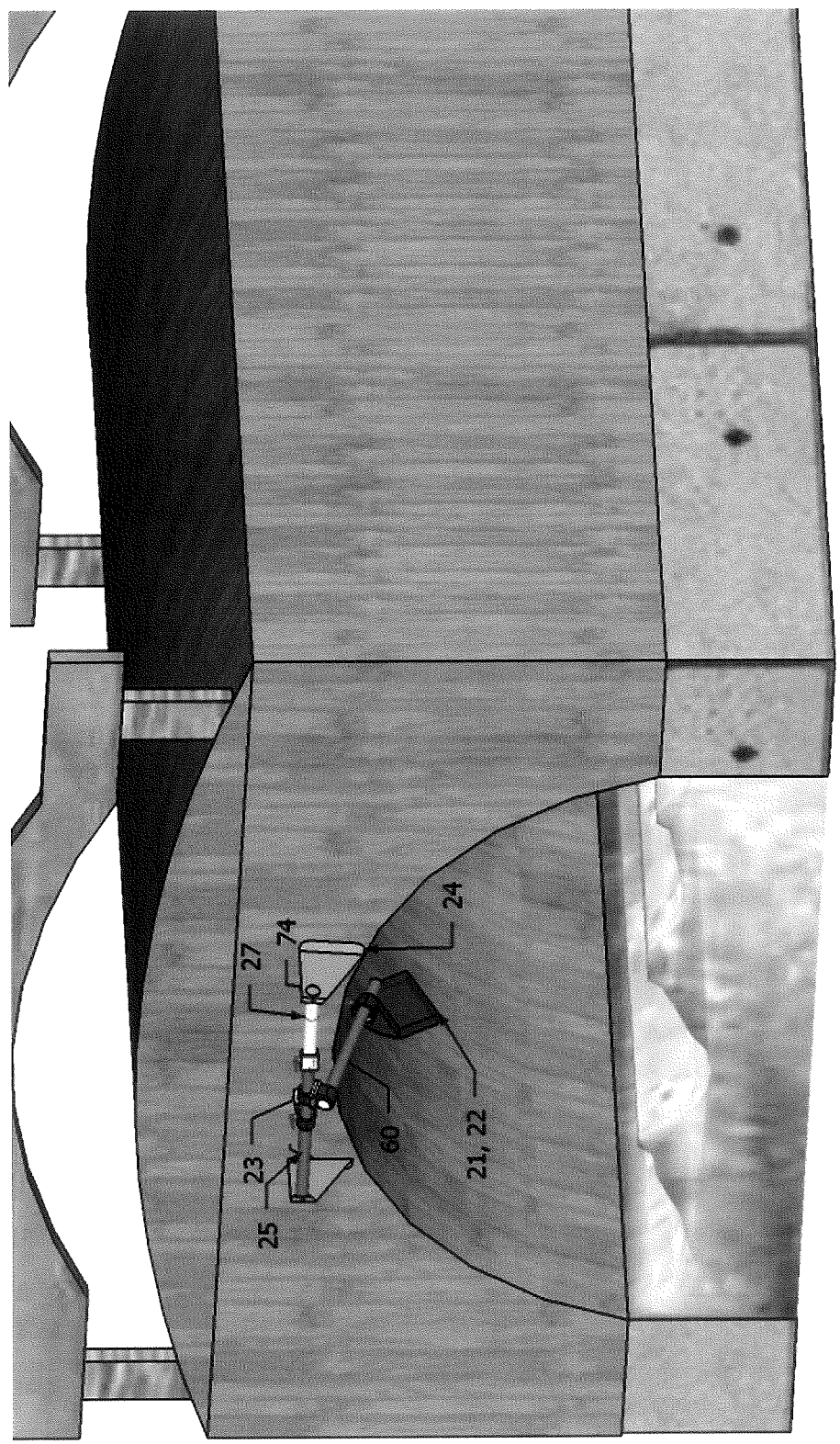
FIG. 4 is a diagram of an FWS in a culvert.

An interposer offers distinct advantages for sewer, pipe, or open channel installation not available currently. It allows for drop in installation without changes to the sewer (FIGS. 2A to 2C). The design is adaptable to different shapes, diameters and depths of manholes, channels, and pipes. An interposer provides a structure to support some or all of the following equipment (not limited to): power, communications, lighting, imaging, sound detection and recording, onsite computation, tamper detection, proximity detection, temperature sensing, monitoring accessories (e.g. air quality/gas sensor, microphone), and tethered accessories (e.g. in-stream water quality sensor). For example, components can be attached to an interposer 60 via direct or articulated (23, 101) attachment, a physical tether, a cable, or other mechanism. The accessory mount (23) is suitable for temporary or permanent attachment of a distance rangefinder and/or 2-dimensional (2-d) or 3-dimensional (3-d) ranging devices (e.g. a range-camera or laser scanner) if they are not included in the enclosure(s) shown. An example of such utility is the attachment of a 1-dimensional distance sensor (e.g. laser rangefinder). A 1-D rangefinder (not shown) can be mounted on an interposer and oriented cross-sectional to flow, the interposer 60 as expressed in FIG. 1A, 10, or 1D, allow the rangefinder to be centered on the area of interest and swept in a plane perpendicular to the flow path, generating a 3-dimensional cross section when coupled with common position aware electronics such as a gyroscope, compass, or accelerometer. Additionally, the interposer 60 can be configured for mounting over or in vertical or semi-vertical pipes (such as in a roof drain or a cleanout FIG. 3) or in, above, or near channels (FIG. 4). FIG. 3 illustrates the application of the FWS to monitor flow into a roof drain. In this case, the interposer 60 can simply be reduced in dimension and placed on a riser above the vertical drain. The opotoelectronics are combined into a single enclosure to minimize footprint. Increasing water flow decreases the free space aperture of the vertical drain. FIG. 4 illustrates the application of an eccentric-like interposer design to the measurement and quantification of flow when mounted above a channel. The optoelectronics are again combined into a single enclosure in this embodiment but separate light/AOC (Always On Computer chip) and image sensor enclosure configurations are also appropriate.

Details on the Hardware of the FWS:

In addition to the interposer 60, the Flowing Water Scope (FWS) also contains electronics and communications equipment in (21) and (22) or (28), and the following (as shown in FIG. 5). The sealed battery pack (12) (also detailed in FIG. 7) is designed to serve power to the FWS. The image sensor enclosure (21) contains one or more image sensors (31), associated optics (e.g. lenses, filters, gratings, etc.), and associated processing (40). The processor 40 is designed to assist in capturing, processing, saving, and transmitting images and requires onboard memory (44) and regulated power (11, 41). An example of processing is the removal of unwanted pixels or low energy onboard detection of distance using triangulation to trigger other actions. The communications chip(s) (37) are designed to move information into and out of the FWS. Communications methods include but are not limited to cellular, WiFi, bluetooth, ethernet, low energy spread spectrum, RS-485, and modbus. Switched power input (41) is governed by the lighting AOC (3), also documented in FIG. 6. Image sensor 31 optionally includes a microphone for use of detecting flow conditions using sound (discussed later). The image sensor (31) may be embodied as a visible spectrum image sensor, a range-camera, thermal image sensor, and/or other image sensors outside the visible range (e.g. ultraviolet (UV), infrared (iR)). Unless otherwise mentioned, processes mentioning the image sensor refer to that in the visible spectrum, near UV, or near iR. Different image sensors can be combined in the enclosure. An imaging module microcontroller with integrated wireless connectivity, switches, and a sensor daughterboard (79) is also included to transmit and receive commands from other microcontrolled componentry of the FWS. For example, an AOC microcontroller (3) may send a wireless command to an imaging microcontroller 4 to capture a series of photos under various lighting conditions. The image microcontroller (4) then sends appropriate low-level commands to an image processor which then captures and processes images. The imaging (4) and AOC (3) microcontrollers communicate back and forth to coordinate the lighting conditions with the capturing of the image. The sensor daughterboard (79) (FIG. 6) in the imaging enclosure 21 is intended to detect for poor or unusual operating conditions or tamper (sensors may include but are not limited to humidity, RGB/iR light, and/or pressure sensing).

The AOC/Lighting enclosure (22) contains: an always on computer chip (AOC) with integrated wireless, and limited integrated memory in the AOC/Lighting Microcontroller (3). In addition to the previously described function, it serves to communicate power needs to a battery pack microcontroller (2) in the sealed battery pack (12). The AOC/lighting enclosure (22) also contains a sensor daughterboard (79) intended to detect for poor or unusual operating conditions (sensors may include but are not limited to humidity, RGB/iR light, and/or pressure sensing). Electronically controlled power switches (10) are used to control the transfer of power to components of the light transmission and sensing chassis (42) as well as power to the image microcontroller (4), the image sensor (31) and any accessories using a switched power connector (41). A cell bank (43) is embedded in the AOC/lighting enclosure 22 to allow for the removal and replacement of the battery pack (12) without shutting down the FWS. The lighting transmission and sensing chassis (42) contains multichromatic and/or monochromatic light transmission sources (e.g. colored laser or white LED) and one or more proximity and light intensity sensing devices (iR and RGB light sensor). Lighting equipment is not limited to lasers of various wavelengths [e.g. red, green, blue, UV, infrared] and/or various optic lensing [e.g. line, cross, circle, dot, pattern generator], and/or broad spectrum lighting (e.g. white LED). The lighting equipment is selected for appropriate quantification of flow and water quality in the monitored environment (e.g. sewer, stream, drain, channel) as detailed in another section of the patent. The FWS can be subsetted (for example removing lighting equipment if only using thermal image sensor) or accessorized (for example, adding an air quality sensor).

The onboard RGB/iR sensor uniquely serves multiple functions. As previously mentioned, the sensor daughterboard (79) is intended to detect for poor or unusual operating conditions or tamper. The RGB/iR sensor (FIG. 6, item 45), also depicted in FIG. 7, is a highly leveraged component of the cluster. The RGB/iR sensor (45) provides great utility for the FWS because it can detect the proximity of water as it rises in the manhole column. It can also be used to detect if the manhole cover has been removed. The function of the RGB/iR 45 sensor is as follows: It is an integrated sensor which can measure both light intensity and color (mixture of red, green, and blue (RGB)) at a dynamic range of 1:4,000,000 (≥22-bit resolution). It also is designed to detect proximity using an onboard iR receiver, driver, and an infrared (iR) diode. The well understood mechanism involves pulsing the iR diode, sensing the intensity of the return, and reporting proximity using an intensity vs. distance lookup table or curve. It can detect the proximity of water in the manhole using this mechanism, and can trigger alarms and shut off the FWS before water comes into contact with the system. Similarly, if a secondary RGB/iR sensor 45 is pointed at the manhole lid or wall, then when the manhole cover 70 or interposer 60 is removed, the proximity will change and an unauthorized change in proximity can shut down the FWS or send or sound an alarm (if the FWS is equipped with a sound transmission accessory). Moreover, intrusion can be detected by a sharp and unexpected change in measured RGB light intensity, caused by exposure to ambient light when the manhole cover is lifted.

The RGB/iR sensor 45 can be employed to measure the color of the water surface as well, if fitted with appropriate lensing and simultaneously operated with the white LED in the AOC/lighting enclosure 22. However, the function at a distance is limited when compared to a higher resolution visible spectrum image sensor. The RGB portion of the RGB/iR sensor 45 is thus better used for water quality monitoring in close range, using a mechanism similar to that discussed in the following section on the battery enclosure. Briefly, using a light emitting diode and the RGB sensor, reagents are added to a small, offline, optically transparent chamber or tube filled with the liquid of interest. Structured light (of known intensity and wavelength or wavelengths) is transmitted into the chamber or tube and received at the properly oriented RGB/iR sensor 45. The intensity, time of decay, and spectrum (color) of transmitted light through the chamber (to the RGB receiver) is correlated to water quality, serving the function of a highly sensitive and highly compact spectrophotometer.

Figure 6:
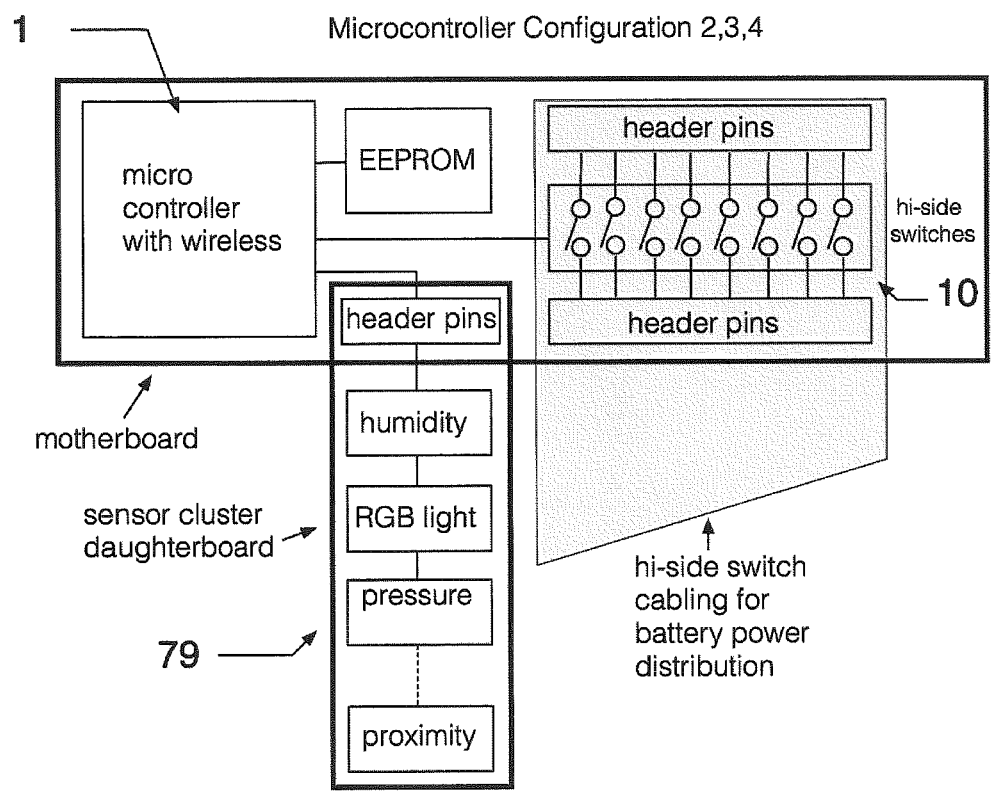
FIG. 6 is a block diagram of a microcontroller configuration.
Figure 7:
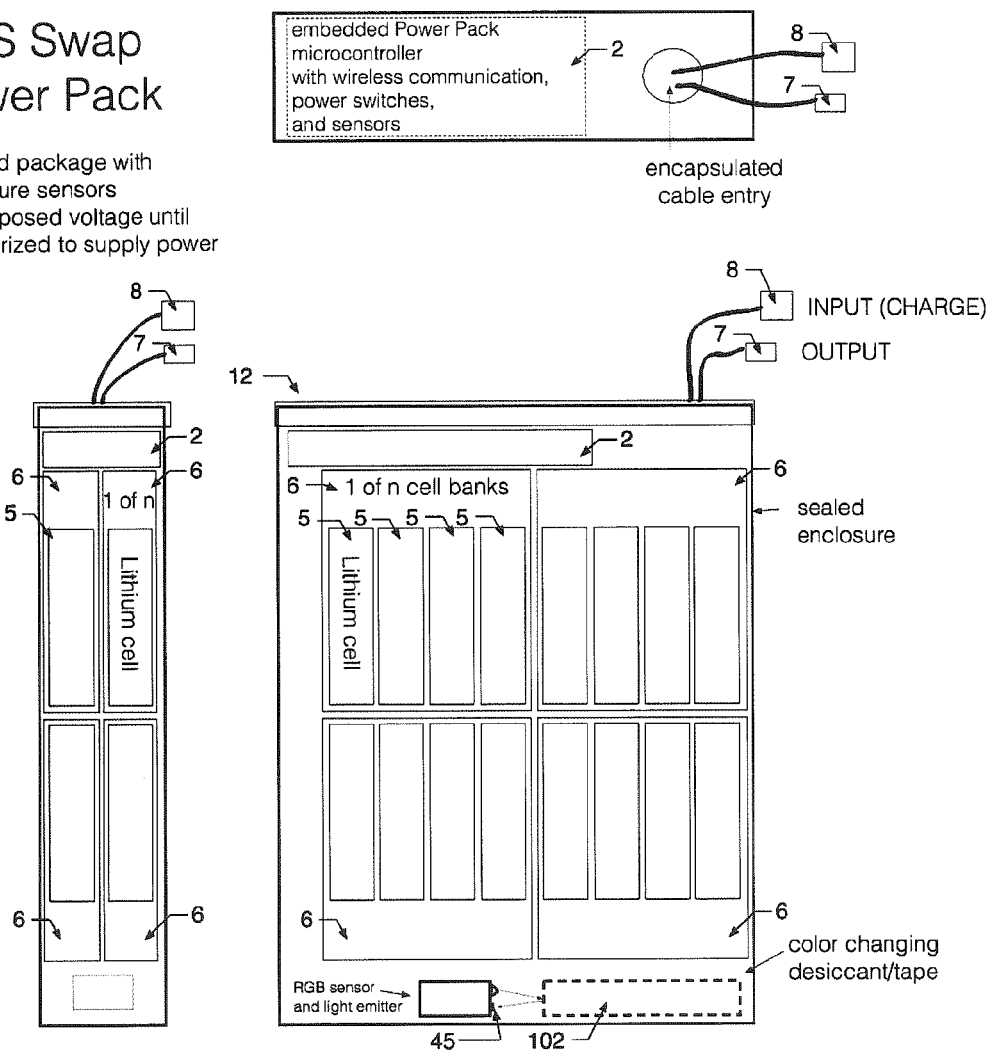
FIG. 7 is a diagram of a lithium battery pack that is replaceable.

As shown in FIG. 7, the sealed battery pack enclosure (12) includes a bank of power cells (6), a microcontroller (2) with integrated wireless and limited integrated memory and sensor daughterboard (79—see FIG. 6). A battery pack regulator (11) is needed to maintain consistent voltage to the microcontroller 2. There are high side switches (10) used to selectively drain the n banks of power cells 6, a process which is managed by the microcontroller 2. The microcontroller 2 will not apply power to a battery pack output power connector (7) unless requested by the AOC/lighting microcontroller or the image sensor microcontroller. A battery pack input power connector (8), is used to recharge the battery. The physical design of the sealed battery pack 12 is further detailed in FIG. 7 wherein the sealed enclosure (12) contains individual cells (5) which are clustered into banks of power cells (6). FIG. 7 additionally portrays pairing the RGB/iR sensor (45) with color changing desiccant (102) to detect and record the amount of moisture in the sealed battery pack. The mechanism is as follows: The microcontroller 2 periodically turns on an integrated LED transmitter (similar to the iR transmitter). If the color changing desiccant becomes moist, it will shift (for example) from orange to blue. The color shift is proportional to the adsorbed moisture. An orange-green color would indicate less moisture in the enclosure than blue, for example. The >22-bit resolution allows this change to be detected at an incredibly fine level to quantify both the level of moisture entering the enclosure and the rate at which it enters (by recording and mathematically comparing successive measurements over time on microcontroller (2).

Figure 8:
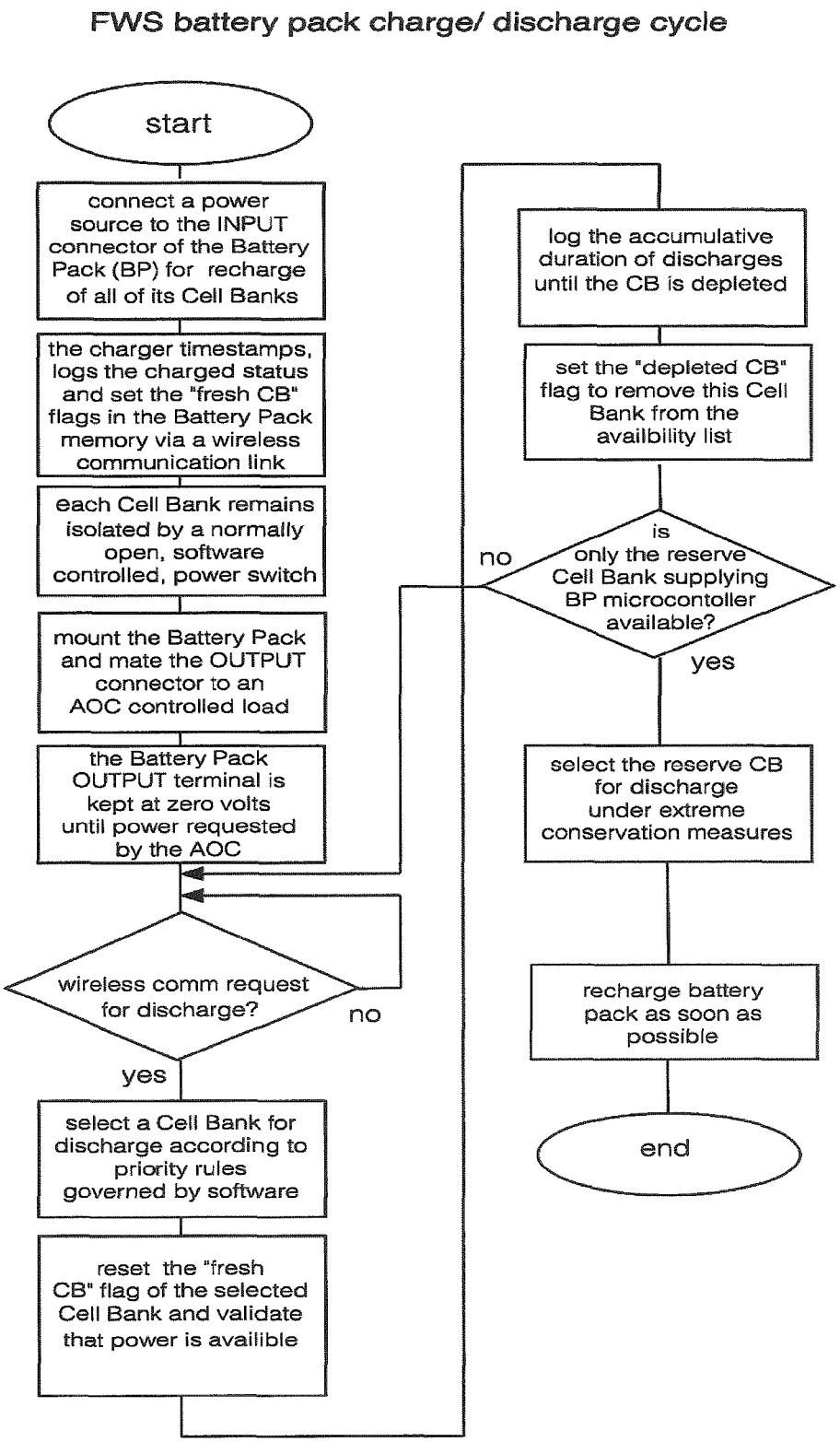
FIG. 8 is a flow chart of a battery pack charge/discharge cycle for use with an FWS.

The process by which the sealed battery pack (12) is charged and discharged is unique to this design. FIG. 8 is a flow chart of the process. In it, after the sealed battery pack (12) is recharged via the input power connector (8), a flag is wirelessly applied to the battery pack memory on the microcontroller (2) that indicates that the power cell banks (6) are ready for use ("fresh CB"). Each of n power cell banks (6) is isolated from power draw using a power switch (10) controlled by microcontroller (2). When the sealed battery pack 12 is then connected to the FWS via the output power connector (7), the FWS is allowed to request power from the sealed battery pack (12). If power is requested, then a power cell (bank 6) is opened for discharging according to rules established by the software. Such rules may include (but are not limited to) mapping around dead cells (5) in the banks or balancing of the change/discharge cycles for various cells (to minimize wear). When power is drawn, the "fresh CB" flag is reset and the duration of discharge for a cell bank is logged until it reaches a low energy level or is exhausted, at which time a "depleted CB" flag is set. If all of the cells available are consumed and there is only enough energy for the microcontroller (2) to function, then extreme energy conservation is enabled and the sealed battery 12 pack must be recharged.

There are no exposed voltages except when power is needed. The battery pack has independent cell banks that can be isolated by switches that preserve the full charge in each cell until needed. There is a change of trust (similar to a chain of custody) established starting at the time the cells are changed until the time they are requested to be put in service to supply load current. Thus the cell banks are more assured to have their rated capacity and the FWS has more dependable up time. Further, as each cell bank is discharged, the battery management software disconnects the corresponding switch to isolate it from the rest of the cell banks. This affords a way of mapping around bad cells. A 12V car battery does not work this way. If one of its 6 cells goes bad the battery will not perform, in other words, your car will not start.

Audio Sampling

Sound wave sampling and detection is used to provide a signature of the flow throughout the audio spectrum. This is unique. Acoustic sensing is not commonly applied to gravity conveyance systems from outside the water or beneath the ultrasonic range.

The audio signature partially consists of frequency amplitude, frequency distribution, and direction of the detected audio signal (upstream or downstream). The signature provides an indication of flow conditions such as surcharge (e.g. burbling with high level of water) or the approaching flow conditions before water reaches the manhole (e.g. based upon the rush/roar of approaching water).

Sound frequency generation (via an attached speaker) can be used to characterize the conveyance system with the aid of one of more microphones on the FWS. The following are two examples of using sound generation and sensing to characterize the system.

In the first example, acoustics can be used to help inform pipe connectivity. This is performed by emitting a sound at one manhole and measuring the decibel level, time to detection, and audio frequency at FWSs in the surrounding manholes. The values are mapped to the locations of the respective receiving FWSs. The direction and magnitude of sound decay throughout the network will indicate whether some pipes may not be connected in the same manner as previously mapped.

In the second example, at any time during deployment, a sound check can be performed by emitting specific audio frequencies at designated manholes throughout the system; the response as measured at the FWS nodes surrounding the transmission source can indicate possible issues (e.g. collapsed or partially blocked pipes).

Sound can also be used for low bandwidth communication between FWSs or with accessories. Sound transmission using engineered frequency patterns (similar to modem technology) allows communication over long ranges, through the pipes, where radiowave penetration is not possible.

Figure 9:
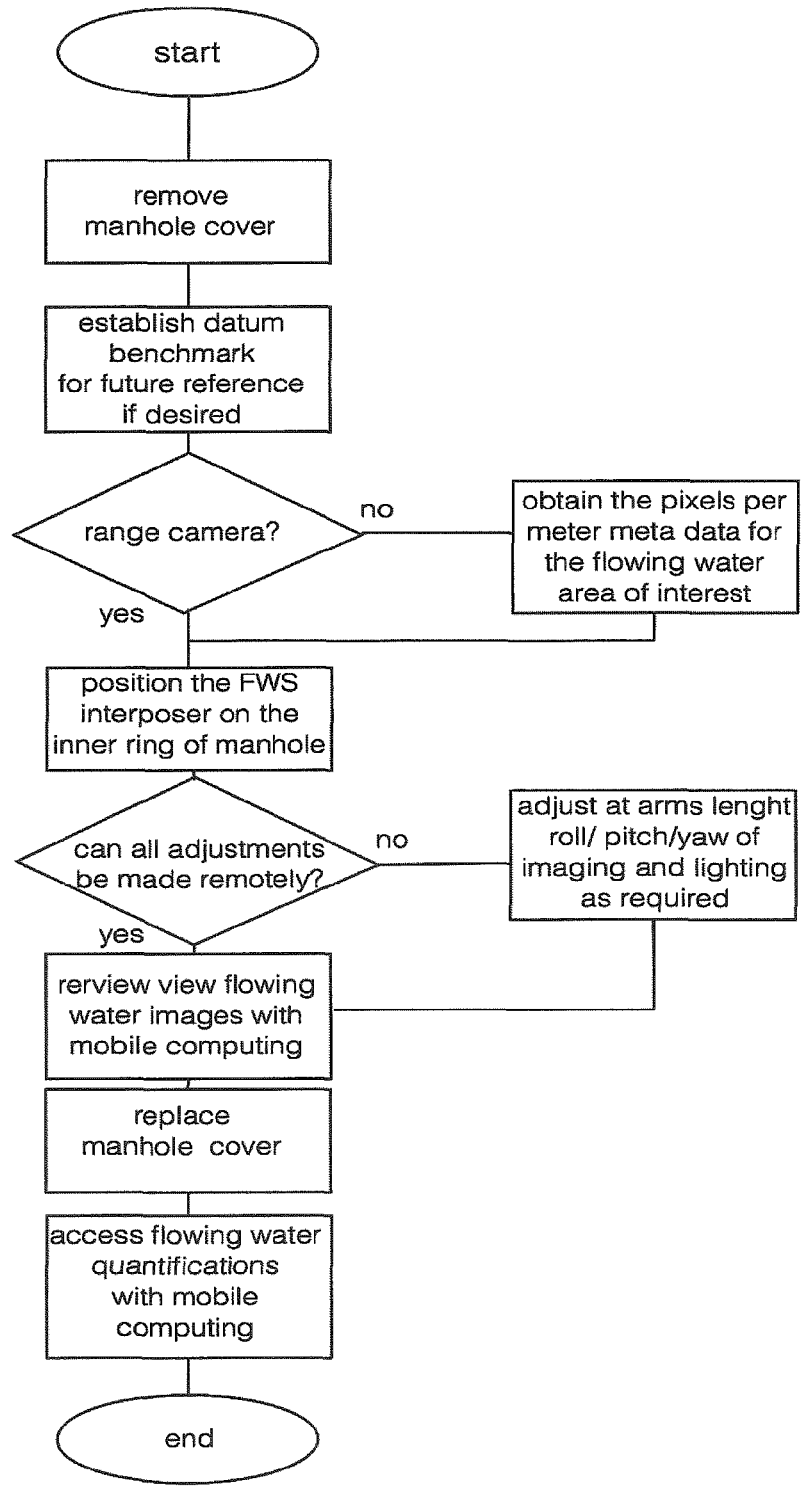
FIG. 9 is a flow chart of a process for installing FWS in a manhole.

Installation:

FIG. 9 is a flow chart of a process for FWS installation in a manhole. Installation to measure flow in culverts and streams is subject to variation between sites in the available mounting locations, the geometry of the channel, etc. Installation over roof drains or vertical pipes is simplified from the method shown in FIG. 9 in that less manipulation is necessary because the subject is generally close to the image sensor and the optoelectronics are combined into a single enclosure. The process shown in FIG. 9 is as follows. After the installer is at the site, the manhole cover (70 see FIG. 2A)) is removed. The installer visually locates the flow channel and establishes a datum (72 see FIGS. 2A-2C) on the manhole rim if desired. This serves to aid in realignment of equipment if the FWS is removed and replaced by lining up datum (72) with interposer alignment notch (20). The datum 72 is placed such that the FWS can be placed in the desired orientation (e.g. parallel to flow). If a range camera is not onboard, then metadata must be used to map the 2-dimensional imagery captured with the onboard image sensor (31) to flow depth. This can be done by knowledge of the characteristics of the manhole, such as pipe diameter, or it can be performed onsite by performing a 2-dimensional cross sectional scan of the area of interest in the sewer channel or by performing a 3-dimensional scan of the manhole environment. These can be performed by temporarily mounting rangefinding equipment on the interposer 60 (as previously discussed) or via other methods as required by scanning equipment. The interposer is then adjusted to fit the diameter of the ring and placed on the inner ring of the manhole. If the interposer embodiment allows for remote adjustment of the FWS, then the installer can review data captured using the FWS via a mobile computing device. Otherwise, the installer should first orient the image enclosure, lighting enclosure, and any mounted accessories to capture the area of interest by sliding, rotating, tilting or otherwise moving it according to the degrees of freedom allowed by the interposer 60 (as discussed previously). When satisfied with the captured data, the installer replaces the manhole cover and can then access the quantified flow from a connected mobile computing device. Here, connected means either connected using local wireless communication within a short range) or connected over the internet.

Architecture

Figure 10:
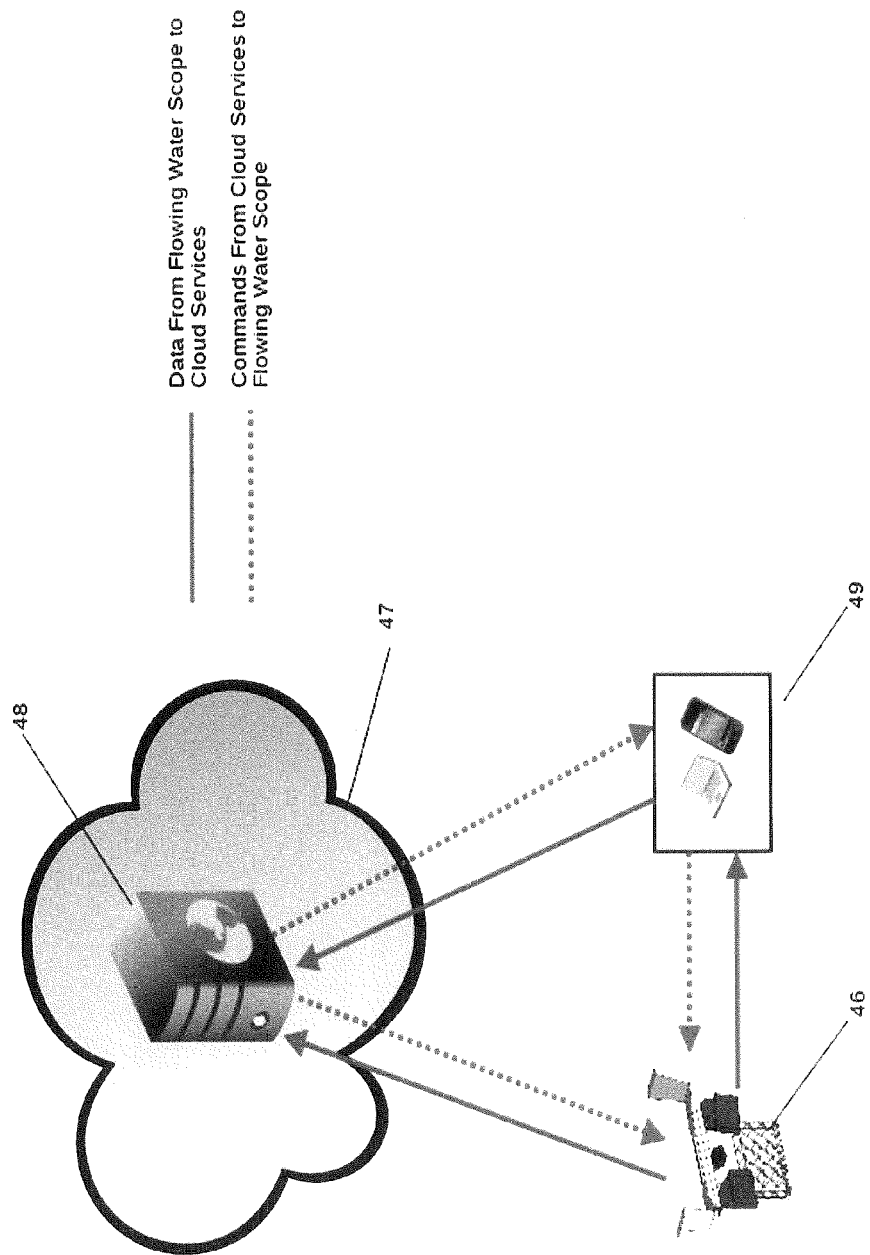
FIG. 10 is a diagram of a communication system between the FWS and the cloud.

FIG. 10 illustrates the high level architectural diagram for communication with the FWS. The Flowing Water Scope (46) can communicate directly with the cloud services (48) if a directed internet connection is available (for example: WiFi, ethernet, cellular modem, etc). If no internet connection is available to the FWS (46), all gathered data will be stored locally until manually harvested by a technician. Manual data harvesting is performed using a wirelessly (e.g.

WiFi and/or Bluetooth) enabled mobile computing device (49) wherein FWS data are transferred to (49) through a local wireless connection. If the wirelessly enabled mobile computing device (49) has an internet connection, FWS data can be transferred to the cloud services (48) through the mobile wirelessly enabled mobile computing device' (49) internet connection. If the wirelessly enabled mobile computing device 49 does not have an internet connection available at the time of data harvesting, data can be cached on the wirelessly enabled mobile computing device 49 and uploaded to the cloud services (48) at a later time when a connection is available.

Figure 11:
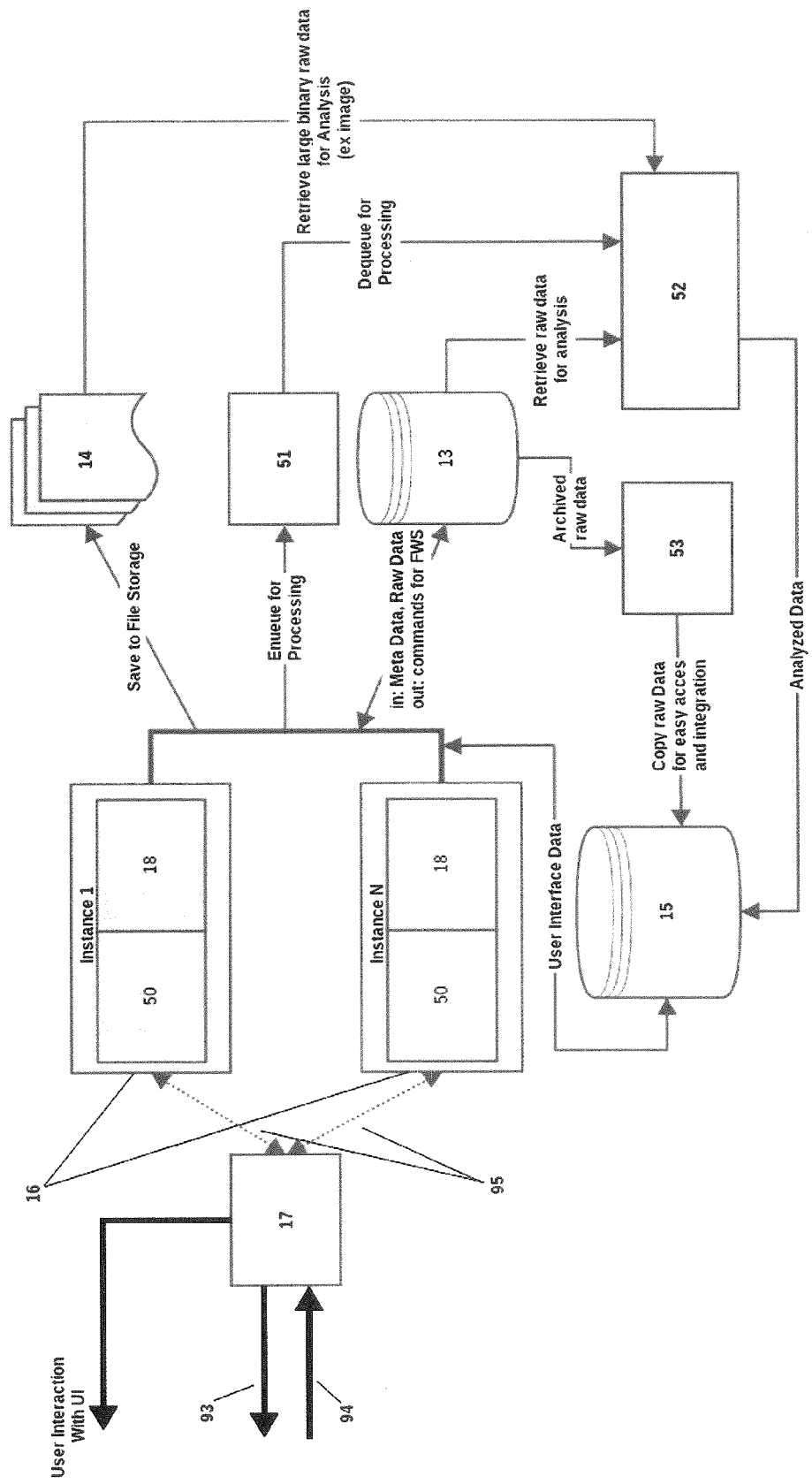
FIG. 11 is a block diagram of cloud services for the FWS.

FIG. 11 depicts the web-service components of the Water Watch Cloud Services™ system. All data uploaded (94) to the cloud services (48) passes through a load-balancer (17) and into a data collection and posting web service (50). The web service (50), along with the User Interface (UI) web application (18), is hosted on a number of virtual computer instances (16) that can be provisioned or removed depending on the instantaneous computing demand. Large binary data (such as images and video) are persisted to a file-based data store (14). Smaller pieces of data such as integers and small text strings are saved to a database that is tuned for rapid insertion of data (13).

Incoming data (94) requiring additional processing are handled by enqueuing a reference to those data in a message queuing system (51). The data may also include an additional context variable (59) to assist in choosing the type of processing to perform for the data. The data processing service (52) dequeues (removes) messages from the message queue (51) and processes the data referenced in the message. Post-processed data are then stored in a relational database (15) that is optimized for searching and reporting.

Algorithms for Extraction and Quantification of Parameters for Monitored Data

Width based flow measurement is the process for producing flow velocity from a digital image of water flowing through an open channel using site-specific metadata and monitored data of surface and/or subsurface velocity measurement. Alternatively, if velocity is not captured, flow measurement can still be performed by other methods, such as the Gauckler-Manning formula, or with the assistance of an aid (e.g. Palmer-Bolus flume).

Figure 12:
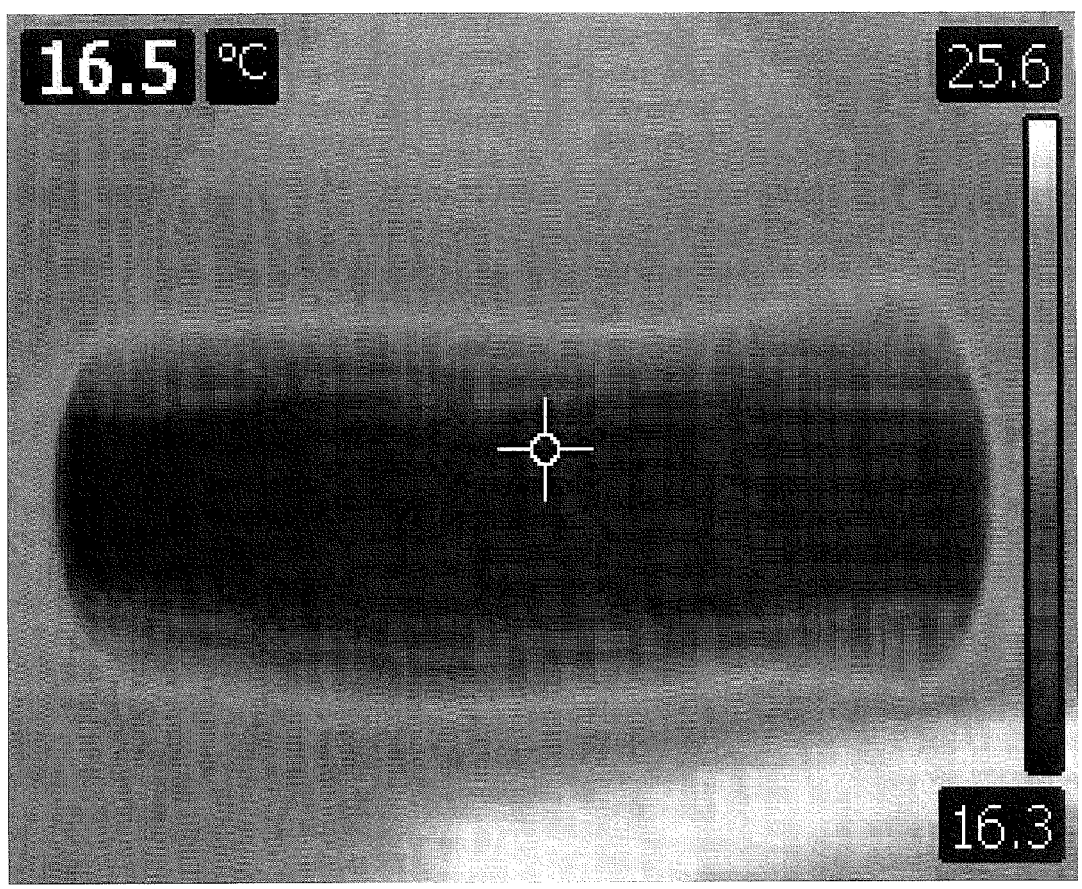
FIG. 12 is a photograph showing the width of the flow in a pipe captured using a thermal image sensor without visible light.

Flow width can be captured using a number of image sensors. A thermal image sensor will provide a distinct contrast between the water surface and the channel walls unless water temperature is the same as the channel wall temperature (FIG. 12). The width of flow can also be calculated by using a range camera (such as those that employ infrared speckled interferometry). This not only captures the width of flow but also can be used to calculate the distance of the water surface from the range camera, providing a straightforward method to determine changes in flow depth. A visible spectrum image sensor and structured light can be paired to provide the necessary information to quantify flow width (and additionally, velocity and water quality data). Flow width (and surface velocity/water quality) can be quantified if at least the center of the channel and one water surface boundary is visible from the perspective of the image sensor. This is possible by digitally mirroring the imaged data from the flow boundary at the channel wall to the channel center or doubling the measured width from the center to the boundary. However, doing so introduces uncertainty in identifying the true flow width; wherever possible, the entire channel width should be sampled.

Figure 13:
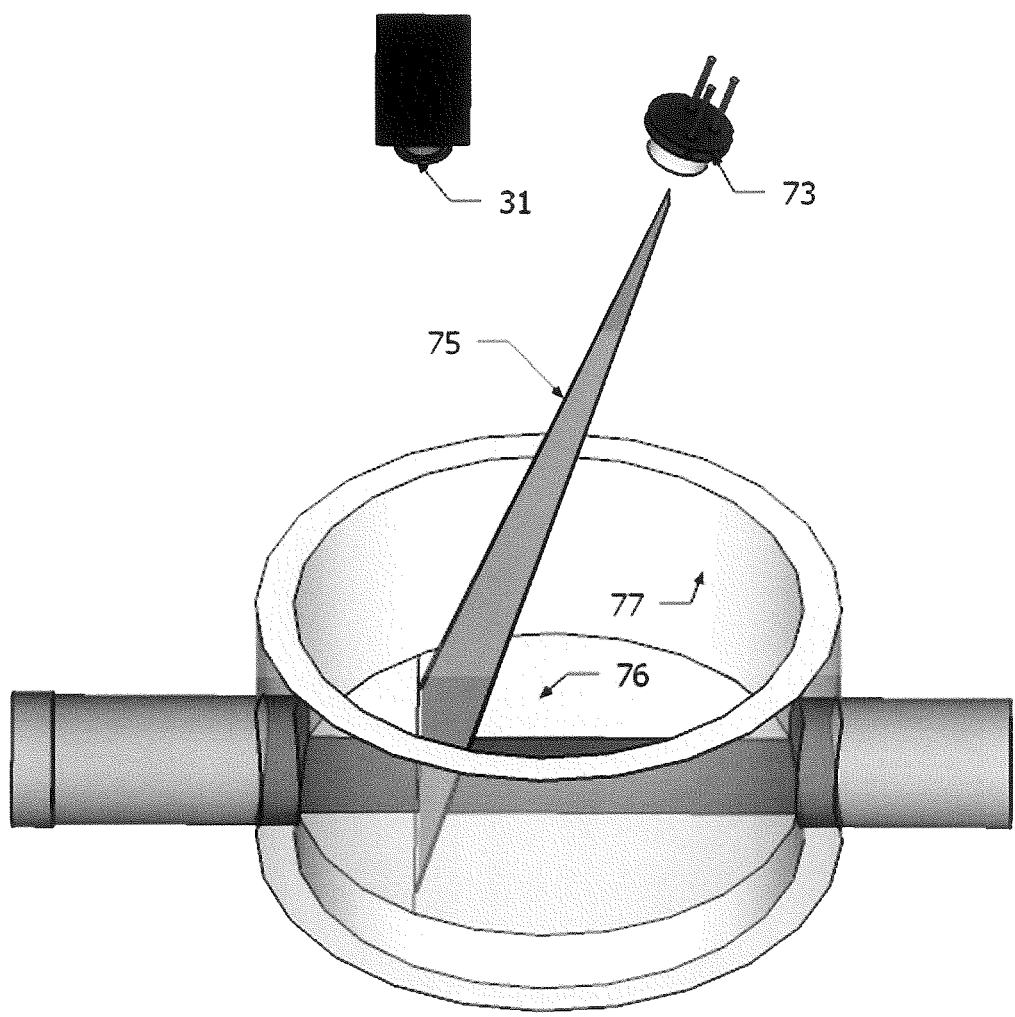
FIG. 13 is a diagram illustrating a laser line (75) projected into a manhole base.
Figure 14:
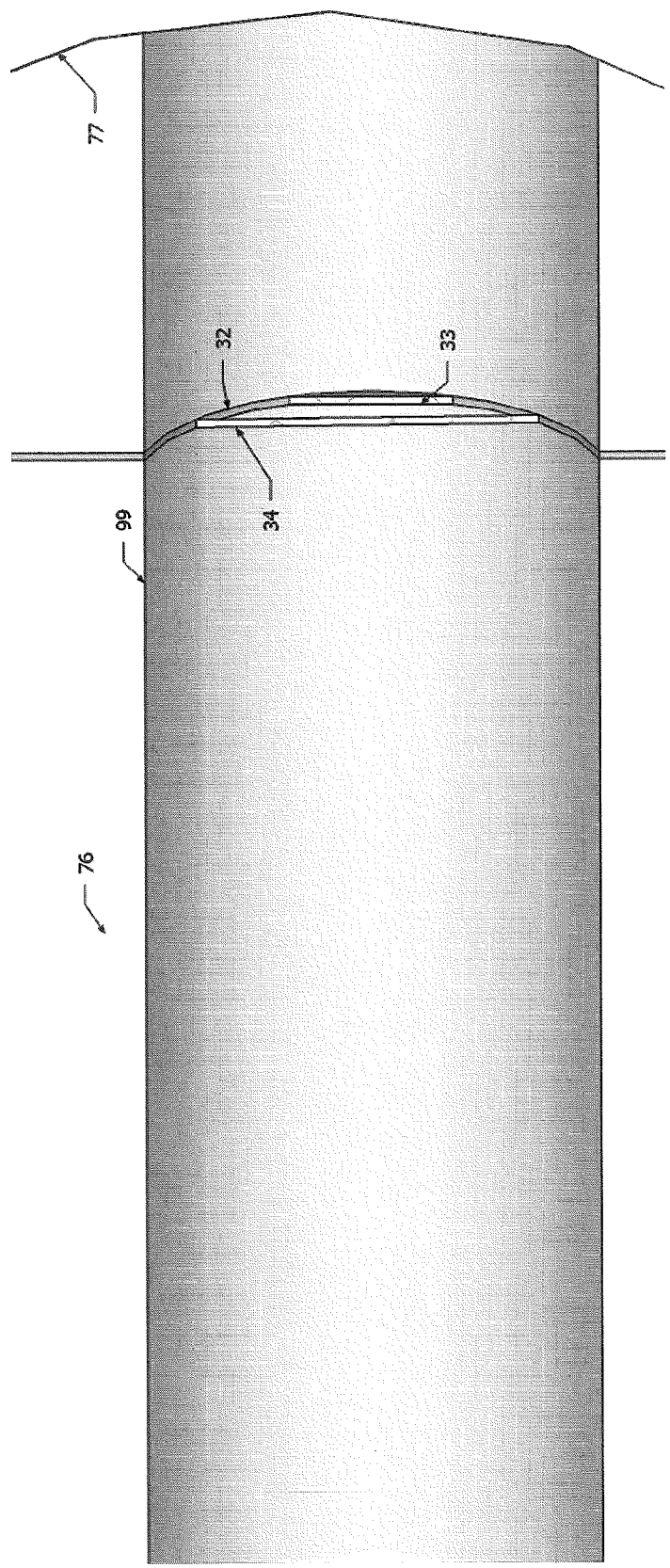
FIG. 14 is a diagram illustrating triangulation to determine the depth of a water flow.

FIG. 13 illustrate a laser line (75) projected into a manhole base (77) from a laser with a line emitting lens (73). The visible spectrum image sensor (31) (which often also sense near iR and near UV wavelengths) is shown to be looking straight down at the manhole bottom (76) in this example. FIG. 14 demonstrates how a laser line would appear across the channel at different water depths from the perspective of the image sensor. Reference number 76 indicates the bottom of the manhole where reference number 99 is the top edge of the channel at bottom of the manhole. The length of the line (from top to bottom in the figure) as shown increases as the level increases. Reference number (33) shows the projected length of the laser line (from the perspective of the image sensor) under shallow depth while reference number (34) depicts the length of the water surface line at high depth. Lines (33) and (34) are identified in multiple ways. Depending on the wavelength of transmitted light, they will either reflect more or less than the surrounding wetted or dry channel. By projecting one or more lines of unique light frequencies, the boundary between the channel and the wetted surface is clearly identified. In this example, the lines are depicted to be much brighter than reference number (32), which could be representative of water in an old and wet channel. Other factors can be used to identify the flow boundary flow width using a visible spectrum image sensor, such as fluorescence of pervasive constituents (such as optical brighteners) in the water under near-UV light (e.g. ≤405 nm). Broad spectrum light (such as that of a white light LED) can also serve to determine flow width based upon the color of the water surface and reflection of light from the water surface (vs. the surrounding channel walls). One advantage to shining a laser line at an angle to the vertical, as depicted in FIG. 14, is that it provides the camera an additional method of edge detection. Lines (33) and (34) are shown to be straight lines rather than curve (32), observed during dry conditions, because, from the perspective of the camera, according to the setup shown in FIG. 13, the projected line follows the curved geometry of the channel bottom if there is no water present. This curve is interrupted by the water surface, producing a point of inflection between the expected curve under dry conditions and line (33) or line (34). Another advantage to shining the laser line as shown is that of triangulation. Although not required for width detection, triangulation can be used to support or improve on the channel geometry documented in the metadata for the site. In FIG. 13, the center of the laser line under high depth conditions (34) appears further to the left of both the line under low depth conditions (33), and the center of the curve under dry conditions (32). The shift in pixels of the center of the line across the image corresponds directly with the depth of the water. This example of triangulation can also be realized by shining a laser dot into the center of the channel. The relationship between the captured pixel location of the aforementioned dot or line on the image sensor center and the distance from the image sensor to the water surface can be looked up using a previously generated calibration table. This requires previous calibration of the FWS under known orientations of both the light transmitter and image sensor.

Figure 15:
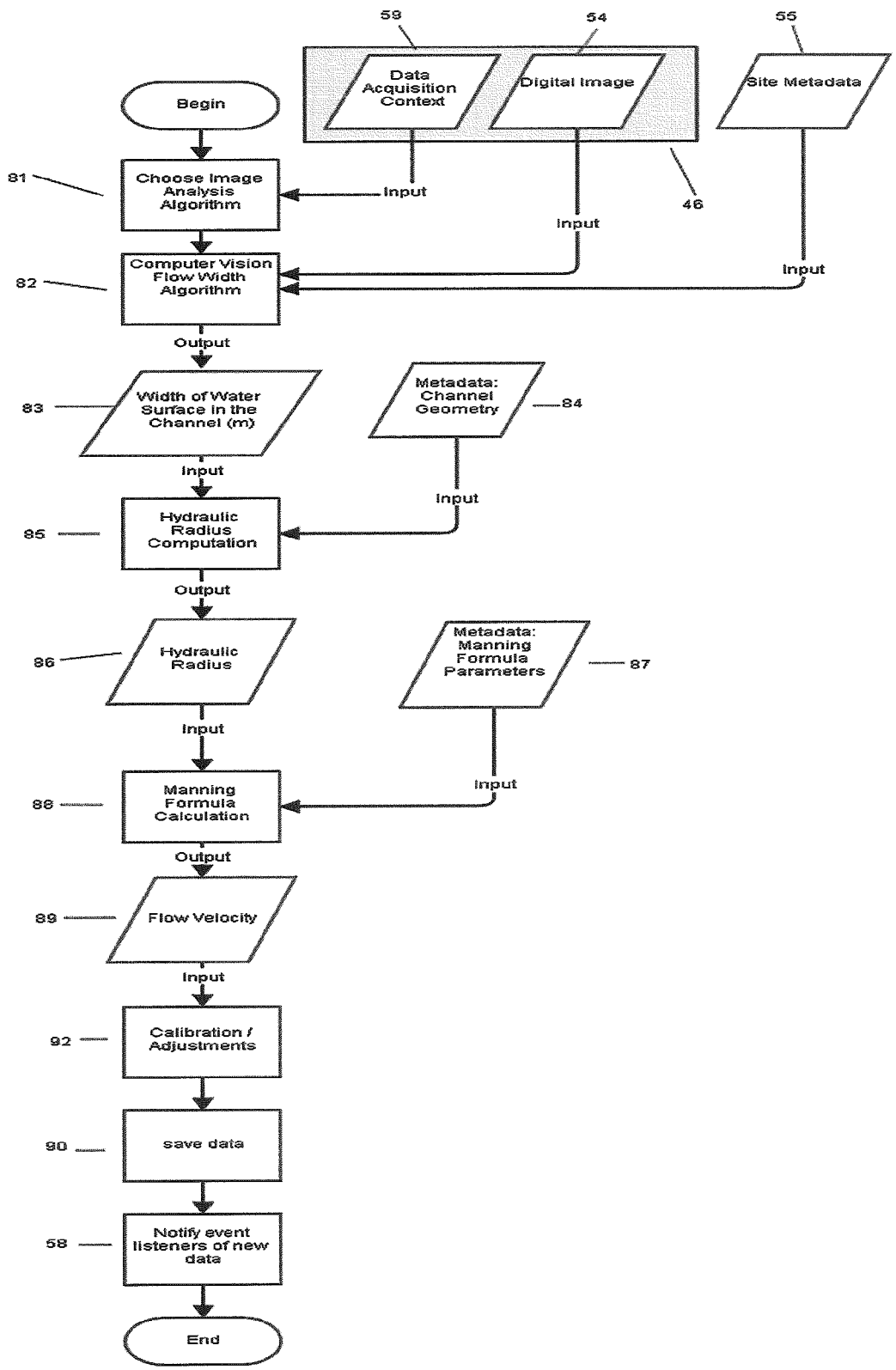
FIG. 15 is a flow chart illustrating a method for determination of flow width.

Flow width is used as part of the process to calculate flow itself. FIG. 15 shows the process by which flow is calculated using Manning's formula. In it, a digital image or images of the monitored water (55) and associated data acquisition context variables (59) are uploaded to cloud services servers (48) from a Flowing Water Scope (46) at a remote site. Image processing is performed in the data processing and analysis (52) block of the cloud services (48). The data acquisition context variable (59) indicates the type of lighting conditions under which the image was acquired. When the digital image (54) arrives, the data acquisition context

(59) variable is used to choose which image analysis algorithm is to be applied to the image (81). The image analysis algorithm (82) uses computer vision edge detection techniques to determine the flow width in pixels. Site specific metadata (55) are then applied to convert from pixel-count to a real-world length. For example, if flow is measured to be 100 pixels in width and the site specific metadata 54 contain a variable stating that there are 5000 pixels per meter for each image coming from that FWS, then the real world flow width would be 0.02 meters. The flow width (83) in meters, along with channel geometry data (84) is used to compute the hydraulic radius (85) in meters. Hydraulic radius (86) is computed (85) by using a 2-dimensional cross-section of an elliptical or trapezoidal channel and the flow width to determine the wetted perimeter (P) and area contained within the wetted perimeter (A). The hydraulic radius is then (A) divided by (P). Note: if the channel is a rectangular channel, flow width cannot be used to determine the Hydraulic Radius. In this case, depth (measured by a number of methods such as triangulation in the Flowing Water Scope 46) can be used to compute the Hydraulic Radius since the width of flow is constant (unless a surcharge has occurred). The Hydraulic Radius (86), Gauckler-Manning coefficient (87) and any conversion factors (87) are then supplied for computation using the Gauckler-Manning formula (88) which produces the average cross-sectional flow velocity (89). Optionally, the flow velocity (89) may be adjusted with calibration data (92). The flow velocity is then persisted to a database (90) (15) for future reference. Finally, a data received event notification is fired (58). This allows other processes to listen for new data coming in from a particular data source (such as a Flowing Water Scope or external web service) and perform a user-defined action.

Figure 16:
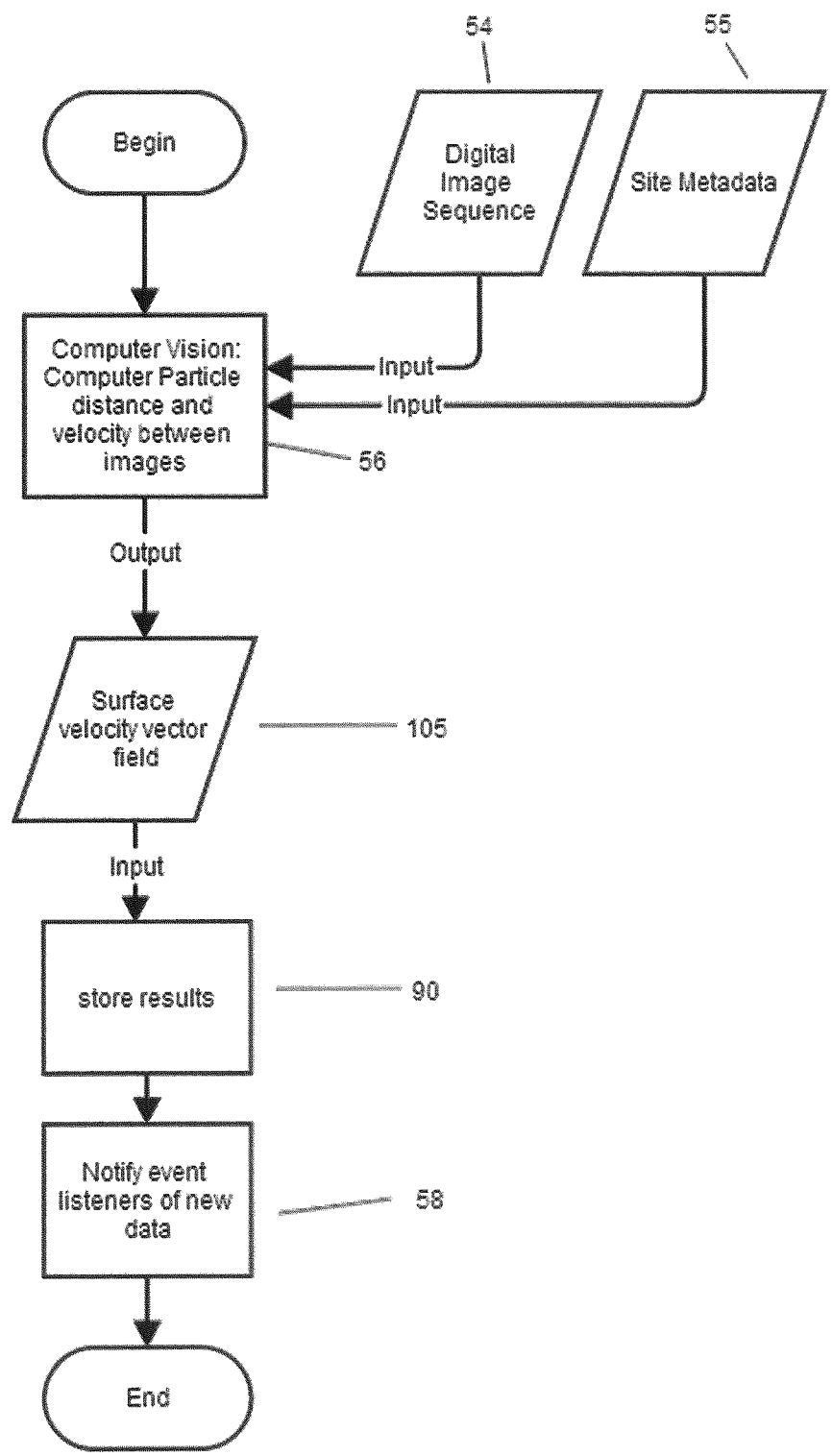
FIG. 16 is a flow chart illustrating a method for determination of particle velocity within the water flow.
Figure 17:
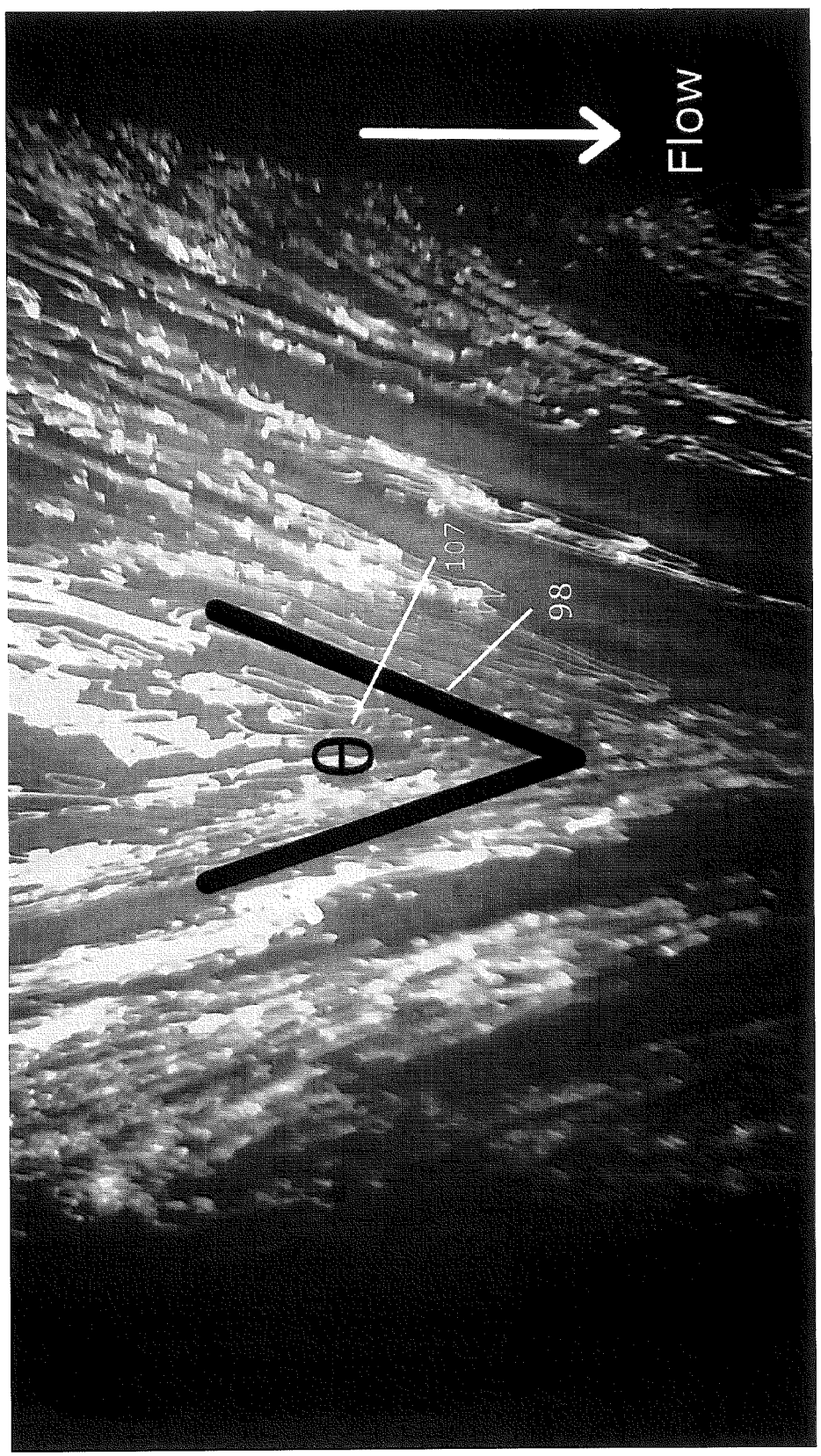
FIG. 17 is a photograph showing the chevron created by a water flow.

The surface velocity of flow in an open channel is produced using a similar process to the image processing routines for flow width and allows for a more direct measurement of flow. One such process is described in FIG. 16. In this case, a sequence of data images 54 taken at known intervals is uploaded to the cloud services 48. Computer vision processing combines the image sequence (54) and site metadata (55) to track the distance and direction of particles between successive images. The site metadata (55) are used to map image pixels to real-world distances. Established computer vision "feature correspondence" algorithms are used to identify the same particle between different images for tracking. The output is a vector field (105) describing the surface flow of water in the channel. The resulting vector field (105) is persisted to the database (90) and an event is fired notifying any listeners (58) of the new data. Another method of calculating velocity when viewing an image of the surface water flowing through an open channel is by analysis of a distinct chevron pattern. This is illustrated in FIG. 17. Using computer vision edge detection, the flow direction can be determined by looking at the direction of the chevron pattern (98). The angle (107) of intersecting flow lines can be measured and used as an indicator of flow velocity on the surface.

Figure 18B:
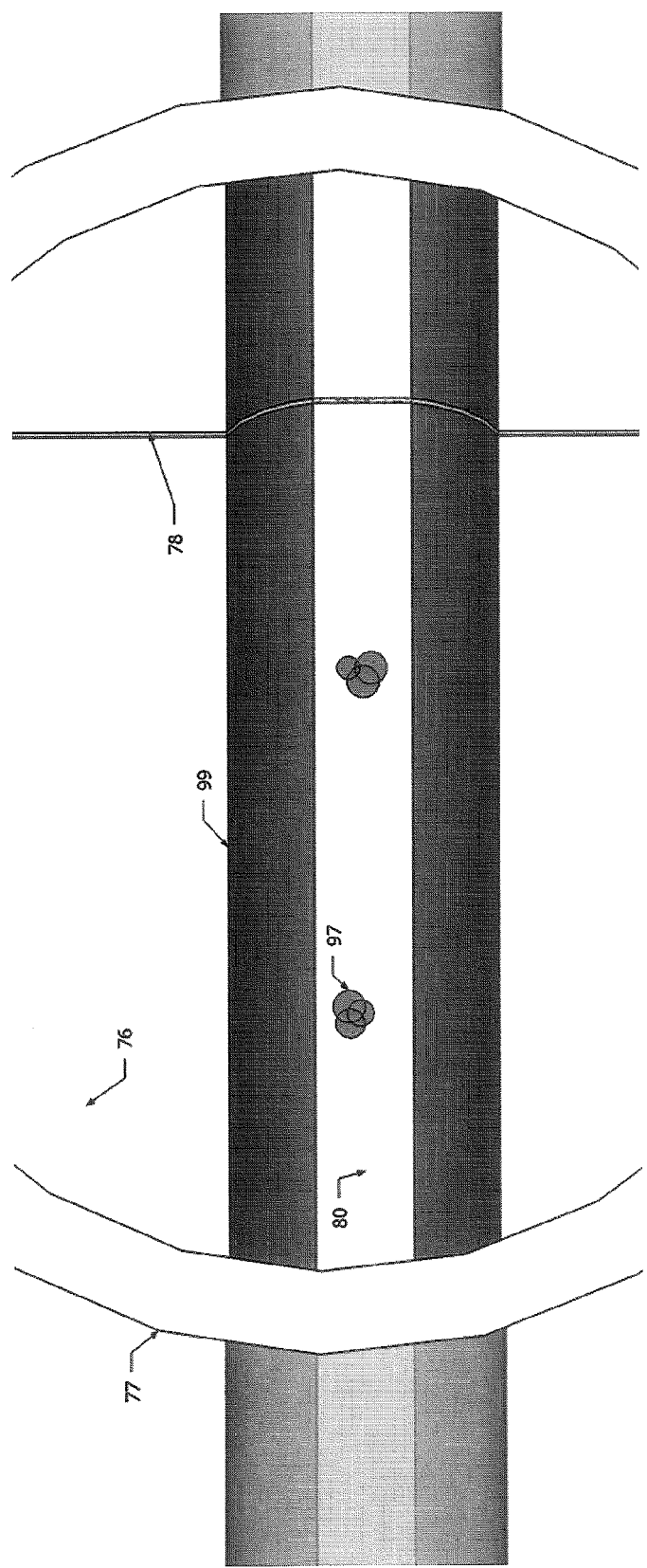
FIGS. 18A through 18 C are diagrams illustrating determination of flow direction and velocity using a thin line.
Figure 18C:
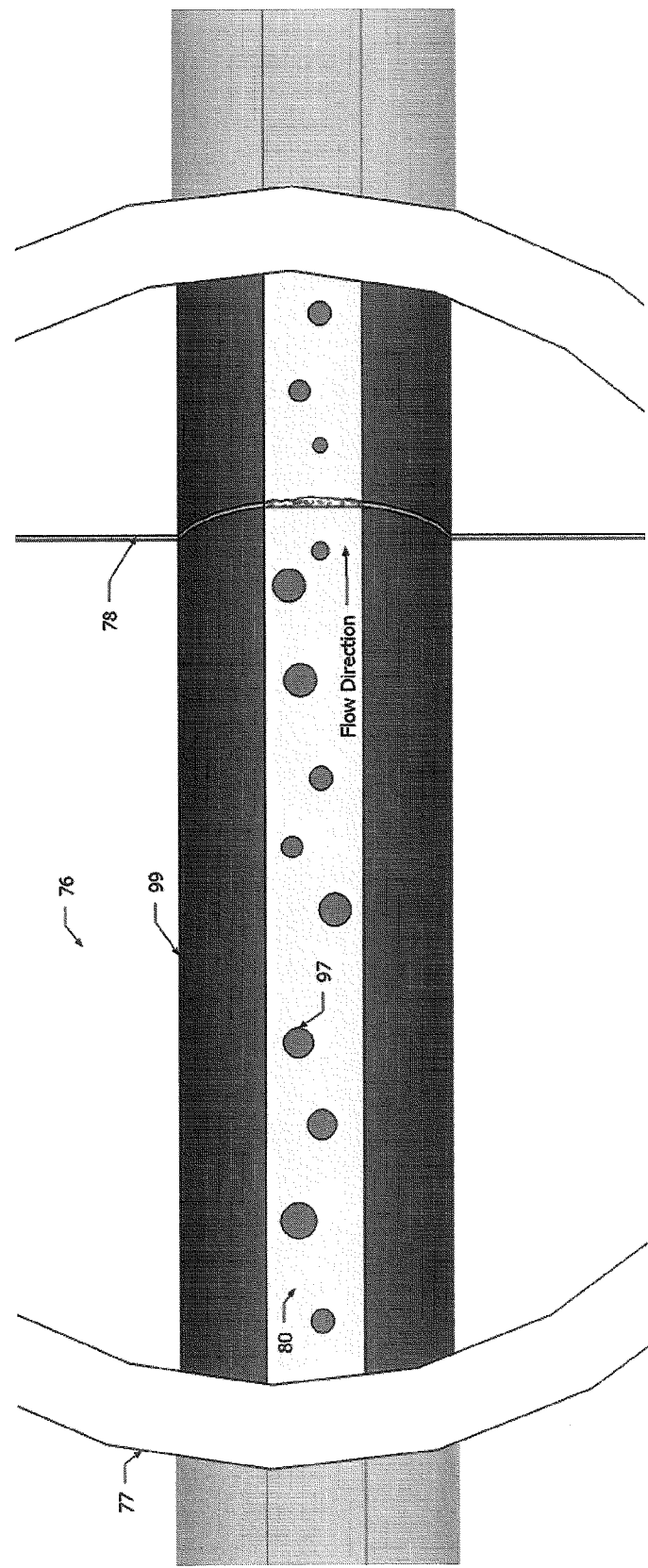
Figure 19A:
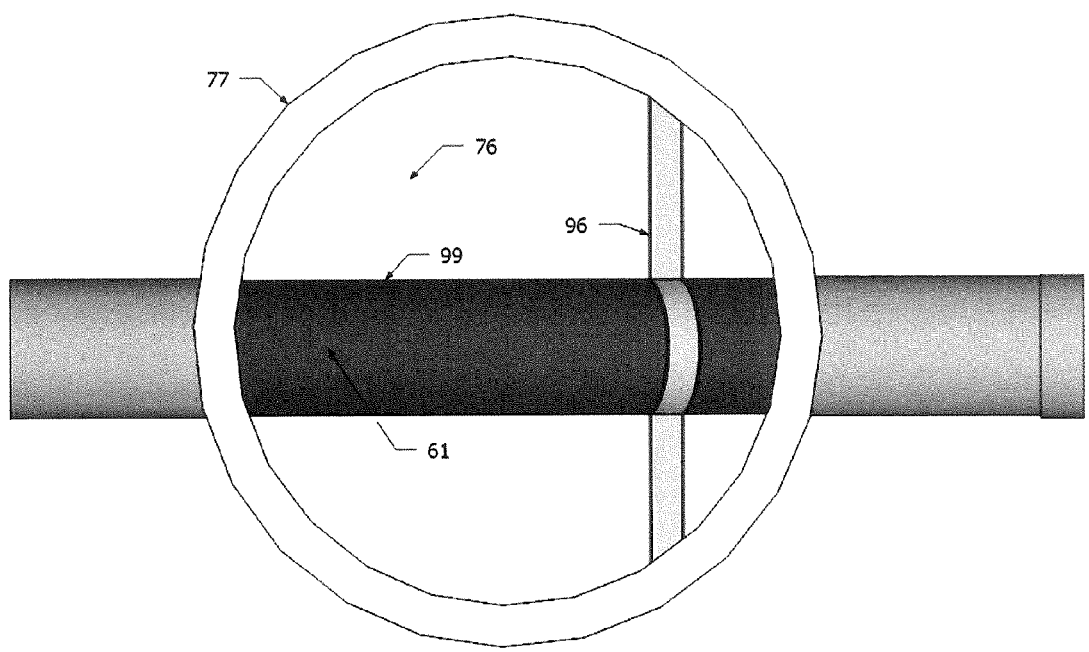
Figure 19B:
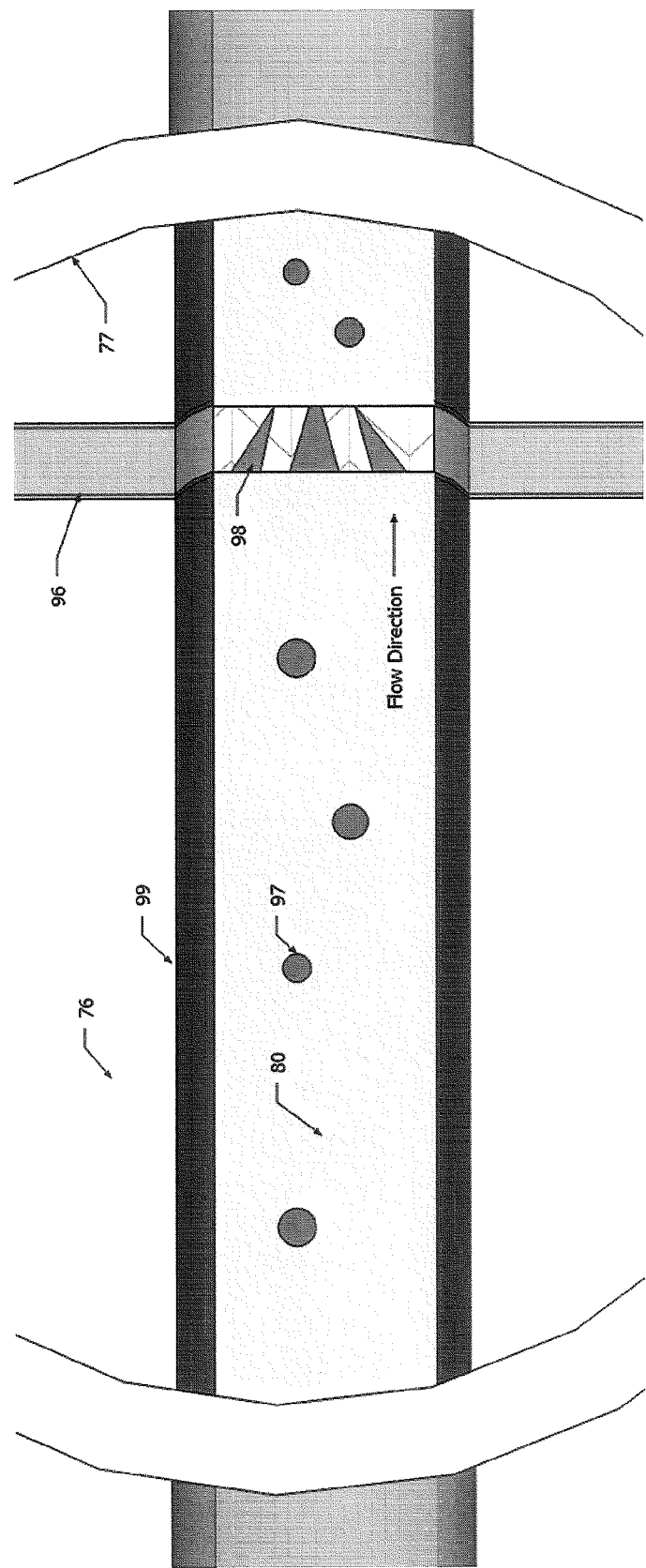

The following figures further illustrate methods of flow direction and surface velocity detection under various flow conditions. FIGS. 18A through 18C illustrate the effect as seen using a thin line while FIGS. 19A through 19C illustrate the effect using a thick projected line. The FWS setup is the same as that in FIG. 13. FIGS. 18A and 19A are provided for the reader as dry flow reference images. FIG. 18B shows the effect of ponded water under obstructed flow conditions. In this case, the projected line (78) appears to form a sharp and crisp edge at the water surface (80) with little frame-to-frame variation. The projected line width itself also appears very crisp under ponded conditions. Also shown in FIG. 18B are particles (97) as visible under diffuse light. Although such particles 97 would not be visible when illuminated with the thin laser line, FIG. 18B serves to show that there is little frame-to-frame variation in particle location (as symbolized by the grouping of floatable particles in the figure). FIG. 18C depicts the laser line as seen under moving flow. In this case, the laser line 78 is blurred downstream of the projection. This blur is proportional to the flow velocity at the surface. Also shown are particles 97 as seen under diffuse light; note that the particles are depicted to move through the system. Although not shown in this figure, flowing water tends to wander in the channel, creating some amount of blur in the flow width detection. This can easily be accounted for by taking multiple images to provide an average width or by capturing one image with an extended exposure to identify the dominant flow width (determined using an intensity threshold of the returned line or other calculation). FIG. 19B is similar to FIG. 18B but the thick line provides some advantages. It exposes the aforementioned chevrons (98) in the captured image and it provides a greater sample size for edge detection. A single image can provide data for multiple cross sectional width calculations to apply a level confidence to the calculation. The beam can also be wide enough to track particles through the beam without the need to use diffuse light. FIG. 19C shows the flow of water under tail water conditions, where flow is proceeding upgradient. This is identified by particle 97 tracking or chevron 98 direction. It can also be determined using a change in the direction of blur when projecting a thin line (not shown). Both these methods of lighting are provided as examples. Other types of lensing provide lighting solutions that can also be employed in the detection of water depth, width, and velocity. Furthermore, while the orientation of the camera and light transmitters shown in these figures allows for triangulation and edge detection using inflections in the curve of projected lines, neither are necessary to produce the effects discussed and shown in the set of FIGS. 18 and 19. Therefore, it is even possible to place the light transmitter and the image sensor in the same enclosure, pointed at the same area of interest, and obtain similar results.

Figure 20A:
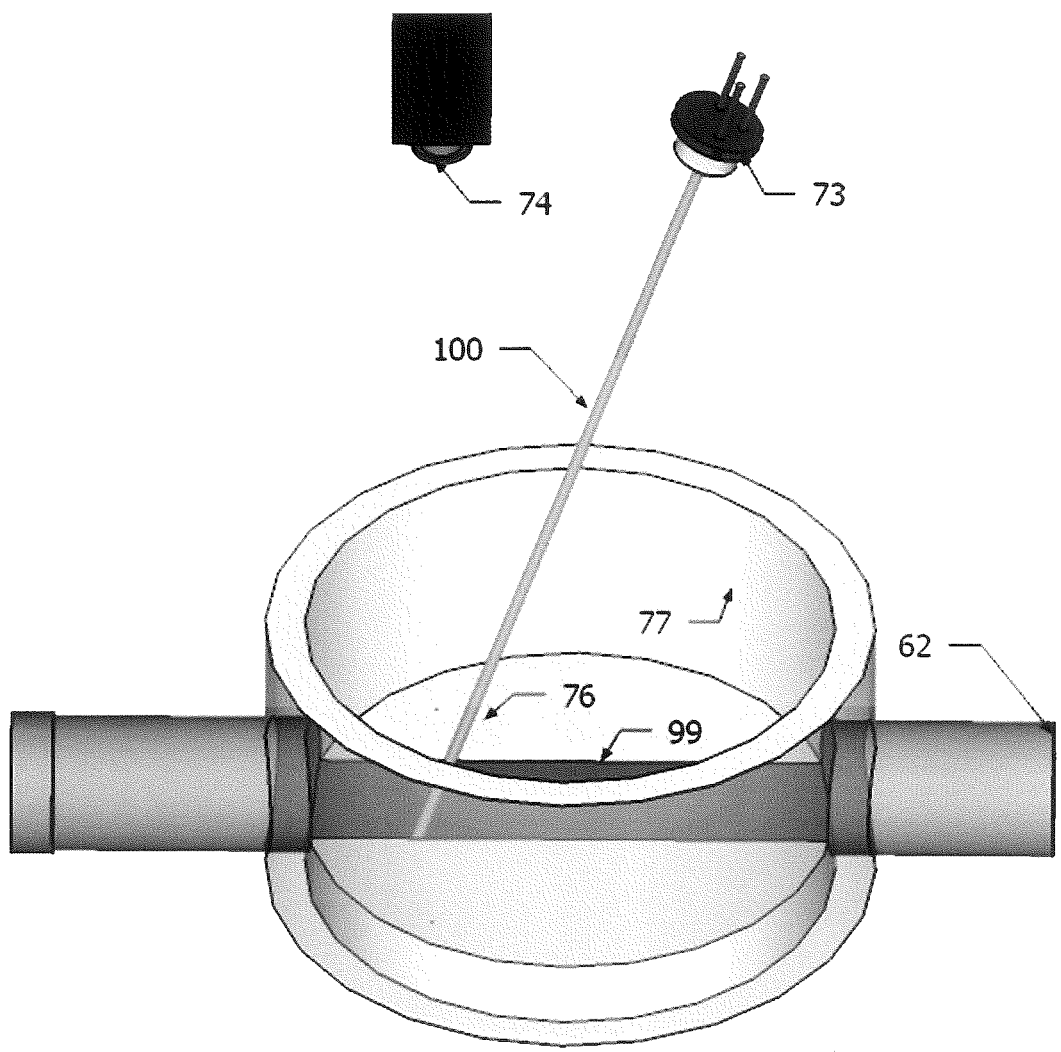
FIG. 20A is a diagram illustrating transmission of a narrow beam of monochromatic light into a channel.

Water Quality Detection:

The FWS 46 has provisions for water quality detection. In addition to using color indicators of flow, exposed under white diffuse or focused light, narrowly focused monochromatic light can be injected in a flowing water medium to determine constituents of the water. This is illustrated in FIGS. 20A and 20B. FIG. 20A depicts the transmission of a narrow beam (100) of monochromatic light into the channel. FIG. 20B shows the effect of the transmitted beam on the water surface (80). The beam 100 causes blooming (lateral diffusion of the light within the monitored flow in the channel (101). The diameter of the bloom and the intensity of the reflected light are a non-linear function of the turbidity of the water. A light transmitted in the 515-530 nm frequency produced optimal results for the water quality analysis but other wavelengths also perform well.

Changes in temperature are measured using a temperature sensor accessory (such as a single point infrared temperature sensor) or using a thermal image sensor. A sharp thermal change can indicate inflow and infiltration into sewage (for example, warm wastewater is displaced by cool groundwater or stormwater) or illicit discharge (high temperature process water discharged into creek). Changes in the temperature of backed up water (over time) also indicate rates of biologic activity. Water with significant microorganism growth will produce more heat than water with less biologic activity.

As mentioned previously, ultraviolet (UV) or near-UV lighting allows for the identification of constituents (namely, optical brighteners) and fluorescent material (e.g. tracer dyes) because the transmitted light will cause fluorescence (re-emission of light) when illuminating fluorescent material. This can be used to determine the relative proportion of stormwater flow and wastewater flow in a combined sewer. Wastewater from residential areas will tend to create a detectable fluorescence. Stormwater will not cause fluorescence. Algorithms are designed to calculate the relative proportion of the two in a straightforward manner Historical data are analyzed to determine whether wastewater flow data recorded before a wet-weather event showed typical wastewater discharge characteristics (flow rate, fluorescence). If the data before an event are congruent with other historical data, then changes in the monitored fluorescence during a wet weather event, as compared to the expected historical patterns of wastewater flow during that time of day, are proportional to the amount of stormwater in the flow. The same can also be used to detect inflow and infiltration (I&I), a common problem in separate sewer systems. This comparison of monitored data with historical data patterns is an example of active learning, which is further discussed later. Fluorescence can conversely be used to detect the addition of sewage to surface water, wherein surface water generally will not fluoresce significantly, added wastewater will induce fluorescence.

Fluorescence can also be used to trace possible sources of contamination in water flow. For example, one can add dye to a possible source of contamination such as a cracked storage vessel or an suspected illicit drain connection. In this case, the applied dye can be selected to fluoresce when excited at frequencies such as green light.

Near range water quality sensing can also performed using high sensitivity optoelectronics, as previously discussed, wherein the device is analogous to a spectrophotometer or spectral analyzer. The device can operate in-situ (in the flow) but more consistent performance is achieved by attaching a pump to the interposer to draw water from the flow of interest, passing it through an observation chamber or window where the optoelectronic equipment serves to transmit broad (e.g. white) or select frequencies of light (namely iR and near-UV) and detect the properties (e.g. intensity, color) of the detected light as well as the extinction rate of the detected color. This is designed to be paired with reagents stored on the interposer or nearby and with precise dosing of reagent into the sample. Such processes are used to quickly detect chloride, for example. The effectiveness of this method is subject to interference and the opacity of the water itself, however.

Figure 21:
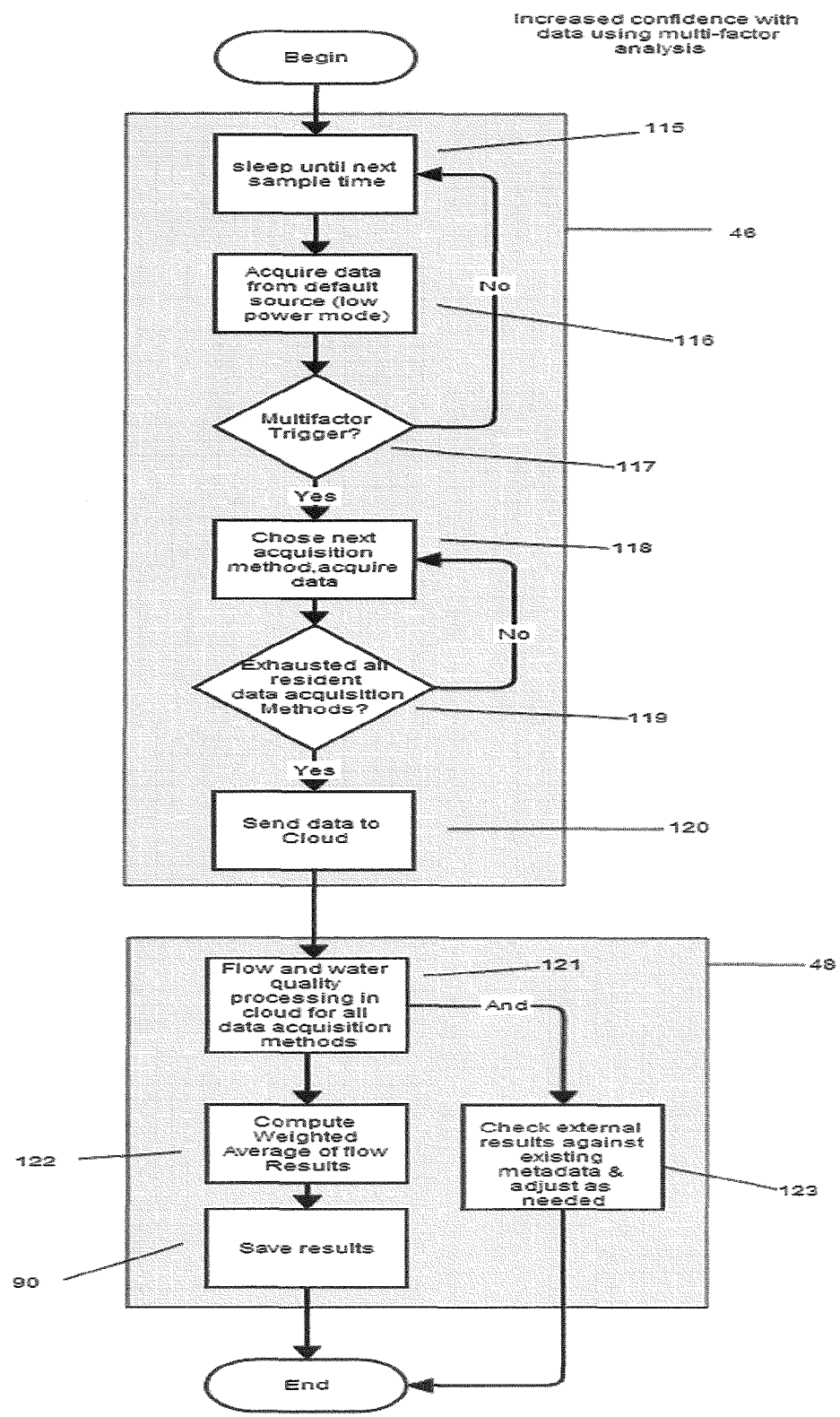
FIG. 21 is a flow chart illustrating a method for increasing confidence in results using multi-factor analysis.

Active Learning:

Increased confidence in results can be achieved using multi-factor data analysis, as described in FIG. 21. Image-based flow width can be measured under multiple lighting situations such as white light, lasers and thermal infrared technology. Multi-factor analysis comes into play when images are taken using all available light-based measurements within a short period of time and averaged together for a final result. The averaging is done using a weighted average where a weight is assigned to each data acquisition method based on its accuracy.

In order to save power, the FWS 46 will acquire flow width images using a default acquisition method (115, 116) (i.e. using a laser light). A multifactor data acquisition may be triggered by a command from the cloud services or by another sensor (117) on the Flowing Water Scope (46). Once multifactor acquisition is triggered, the FWS 46 acquires flow width images using all available methods (118,119), for example capturing an image using white light, followed by a thick blue laser line, followed by capture of a thermal image, etc. A special data context variable (59) is associated with each data acquisition and is used to tell the cloud services 48 which method was used to acquire the data. Once all data have been acquired, they are sent to the cloud (120).

Inside the cloud (58) data processing and analysis service (52), flow is extracted from each image in the set using any of the flow width image processing methods (121). The flow velocity output is then averaged against the other results in the set using a weighted average based on the accuracy of each method (122). The accuracy of each data acquisition method is stored in the metadata set for FWS 46 at that site. Input from a user or a third party instrument can be used to adjust the accuracy weighting (123). The resulting weighted average is then saved to the database (90).

Figure 22:
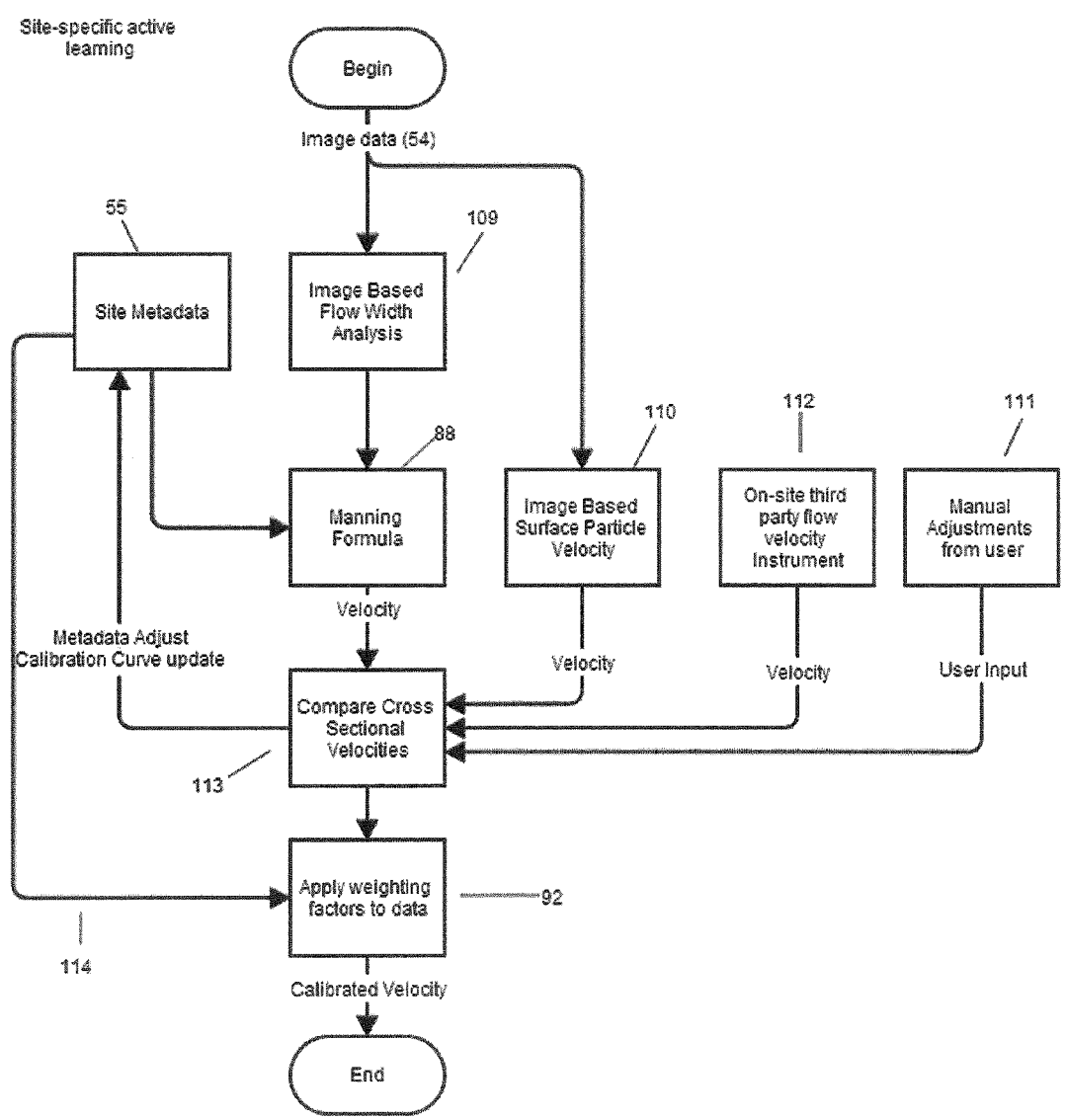
FIG. 22 is a flow chart illustrating a method for improving data measurement at a specific site by adding an additional module.
Figure 23:
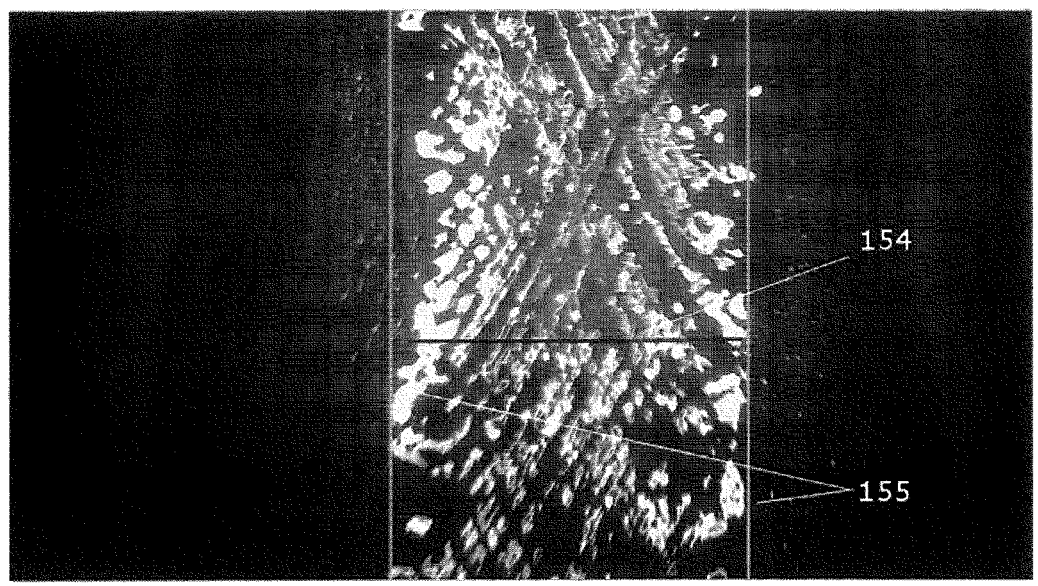
FIG. 23 is a photograph showing a user assisted flow width line for adjusting a flow width algorithm.
Figure 24:
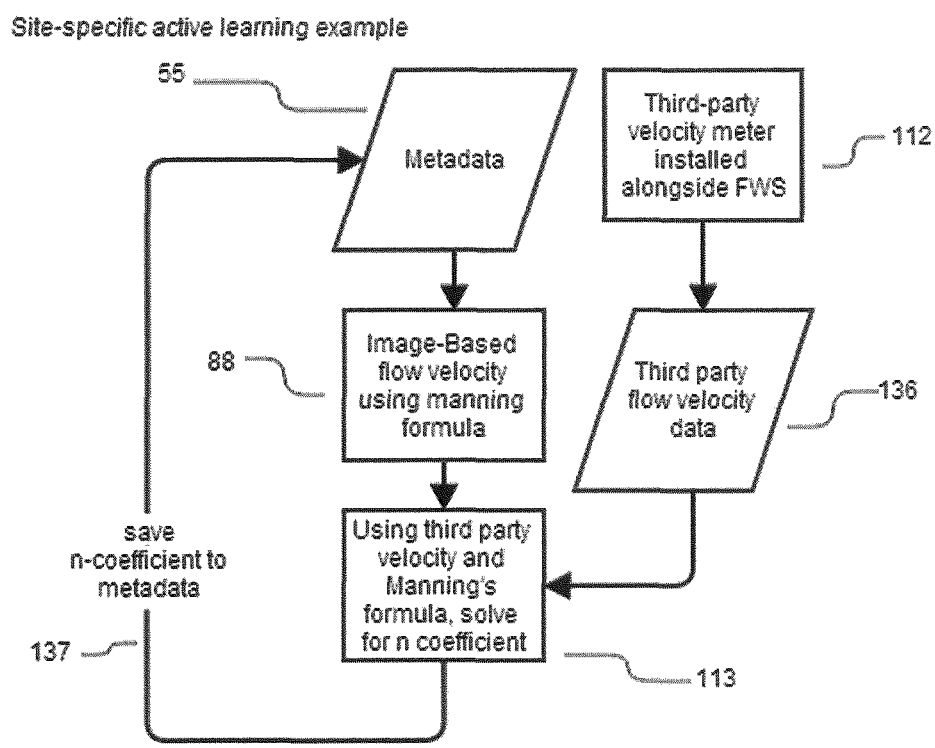
FIG. 24 is a flow chart illustrating a method for using an additional module to measure flow velocity and adjust the image-based flow width vs. flow velocity analysis.

Active Learning at a Specific Site:

Image-based flow measurement can be adjusted for improved accuracy at a specific site by adding third party instruments (112) to the FWS (46), shown in FIG. 22. Accuracy can also be improved by using the results of particle velocity image analysis (110) to compare the surface velocity of the water with the cross-sectional average flow velocity derived from still images of flow width (88), as diagrammed in FIG. 22. Results from image based surface particle velocity calculation 110 third party instruments 112 are combined and compared with results from Manning Formula calculations (88) to generate calibration data (113) that can be used to update the metadata (55) which are fed back and used to calculate flow velocity in the Manning Formula calculations (88). Comparison data (114, 92) may also be used to directly adjust the output from Manning Formula calculations (88), for example using a calibration curve stored in metadata (55) to adjust the output of the Manning Formula calculations (88). Users can also manually adjust the calibration curve through the cloud-based user interface (111) by manually setting values in the metadata object for a site or by a user-assisted flow width detection interface (FIG. 23). In FIG. 23, a user assisted flow width line (154) is drawn manually to correct and update the computer vision drawn flow boundary lines as determined by the flow width algorithm (155). Particle velocity derived from video or successive images can also be used to adjust the image-based flow width analysis. An example, shown in FIG. 24, might be to temporarily install a third party instrument (112) to directly measure flow velocity. The direct flow velocity (136) is then used to solve for the Gauckler-Manning coefficient (n) in the Manning formula: $n = (k/v) R^{2/3} S^{1/2}$ where k is a conversion factor, v is cross sectional velocity, R is the hydraulic radius and S is the slope of the channel (113). The n-coefficient is then updated in the metadata (137, 55) and used for future flow-width-based velocity calculations.

The FWS 46 can also be paired with other aids to improve measurements captured at a site (e.g. staff gauge in a pond or wetland; e.g. flume in a sewer channel or stream). One aid that is novel to the application of vision-based flow monitoring is a bend sensor. A bend sensor is a flexible mounted fixture with known stress/strain properties. A bend sensor can serve two major functions. It can serve to provide average cross-sectional water velocity in a sewer (rather than surface velocity) because the degree of bend is proportional to both water depth and cross sectional velocity. The camera can detect and quantify movement of the bend sensor, relating the degree of bend back to velocity at a known depth. This serves to teach the system to correlate surface velocity to average cross sectional velocity. The bend sensor can additionally produce an electrical current based upon the degree of bend. This is recorded by a device attached to the bend sensor and can be transmitted wirelessly to the FWS 46.

Figure 25:
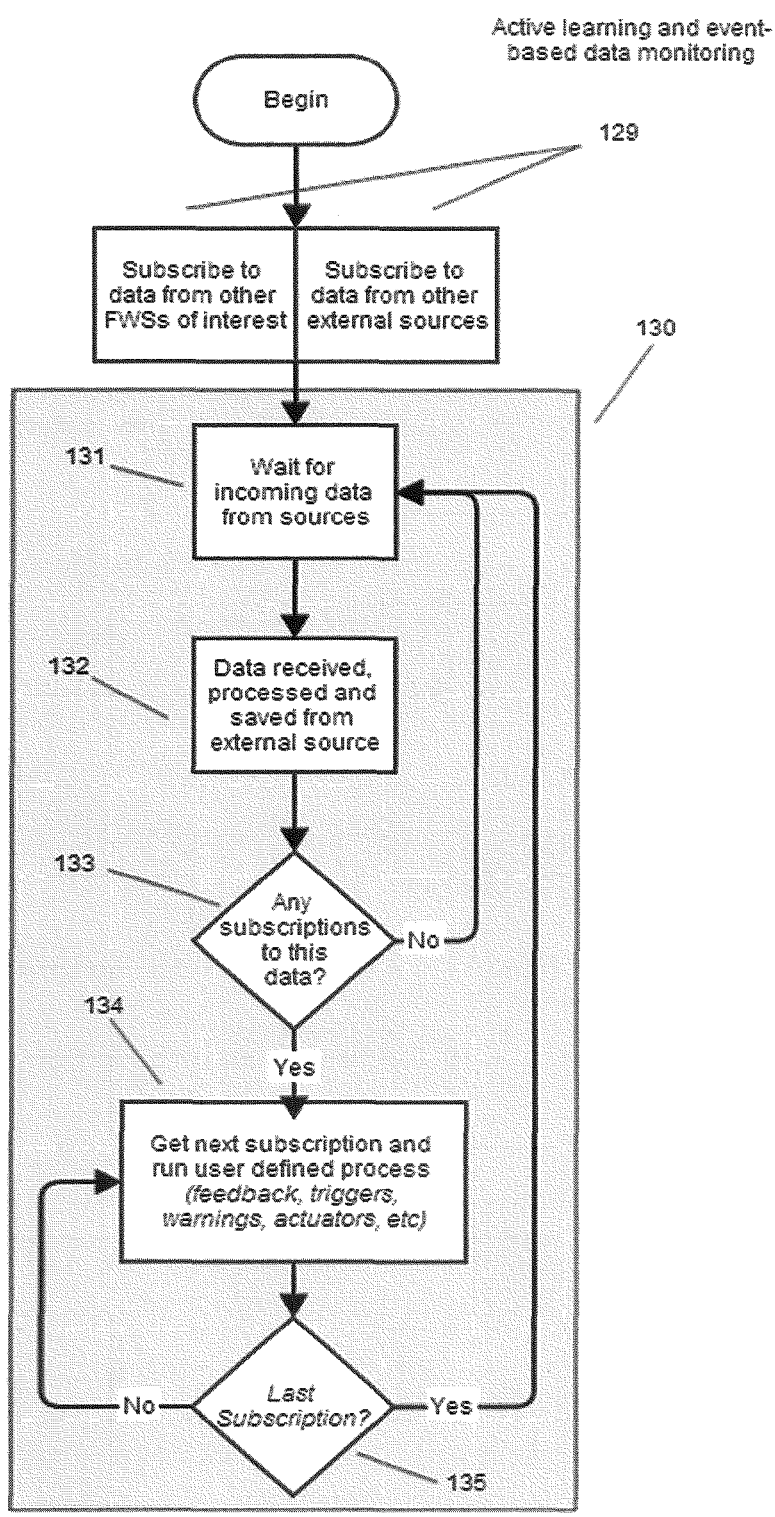
FIG. 25 is a flow chart illustrating a method of creating custom processes from subscription to data from an external resource or other FWS.
Figure 26:
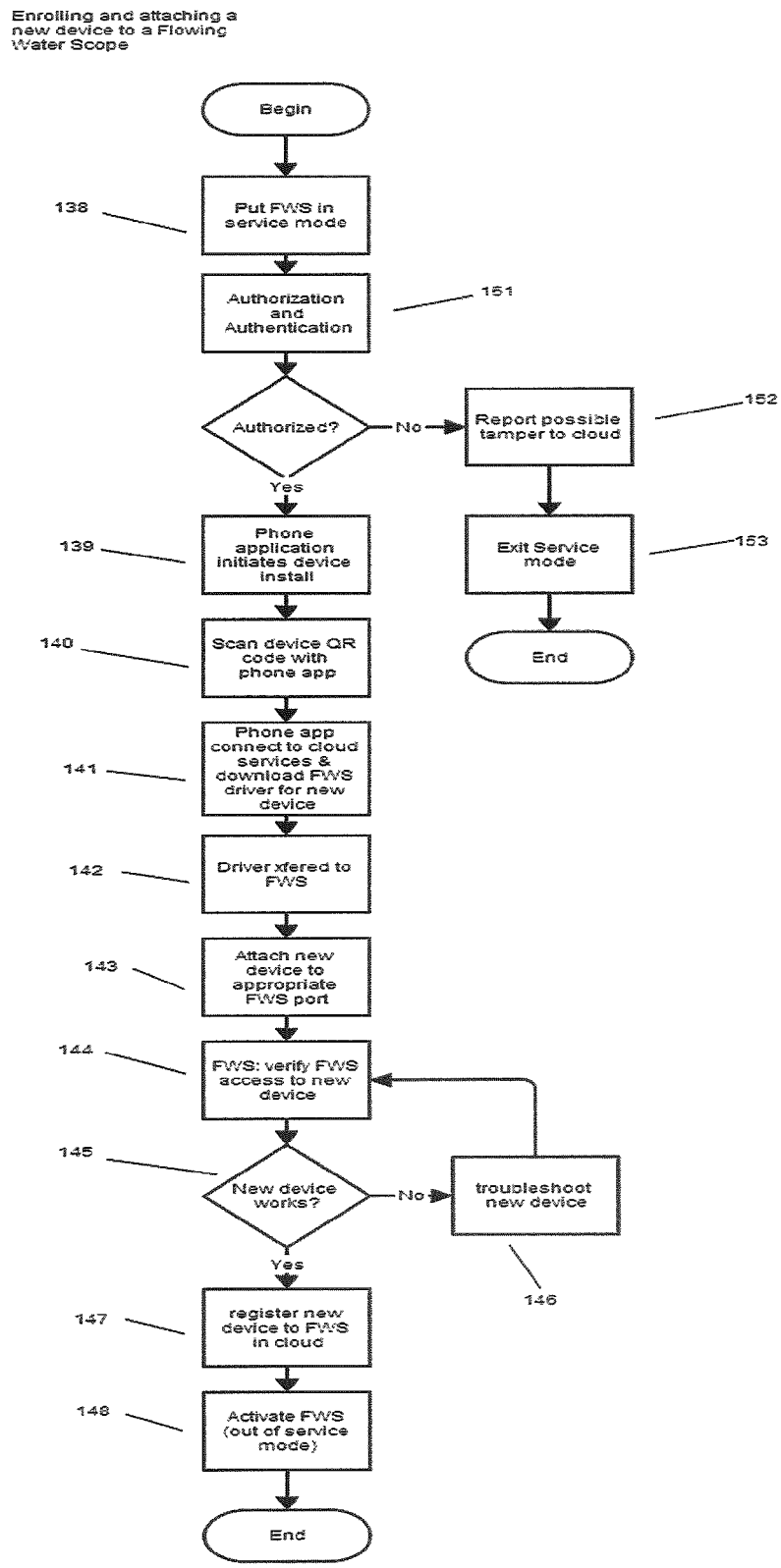
FIG. 26 is a flow chart illustrating a method for enrolling and attaching a new device to an FWS.

Active Learning Across Multiple Sites:

Any time data are saved to the database from a flowing water scope or external web service, an event is triggered in software announcing that new data were saved. Users can create custom processes that are executed when data from a specific source are saved. We call this an event subscription to data from an external resource. The process is charted in FIG. 25. In general, users create a subscription to an external data source (129) such as an FWS 46 or external web service. When data are received from any source (131, 132) the event listener (130) checks to see if there is a list of subscriptions to that data source (133). If there is a list, the event listener (130) visits every subscription and executes the user-defined process (134) associated with that subscription. When all subscriptions in the list have been visited (135), the event listener waits for the next datum to arrive from the source.

For example, a user might create a custom process that sends a command to FWS-B at remote site-B. The command would tell FWS-B to turn on an actuator to restrict flow (ex: inflatable bladder). The user could then create a subscription to incoming data from an FWS-A at remote site-A which is known to be upstream of site-B. If FWS-A reports a flow above 50 gallons per minute (GPM) for more than 1 hour, then the command is executed. Additional logic in the user's custom process might check to see if data from FWS-A show a decrease in flow based on the actuator at FWS-B. In this way, additional data about how events at one site might influence another can be learned.

Figure 28:
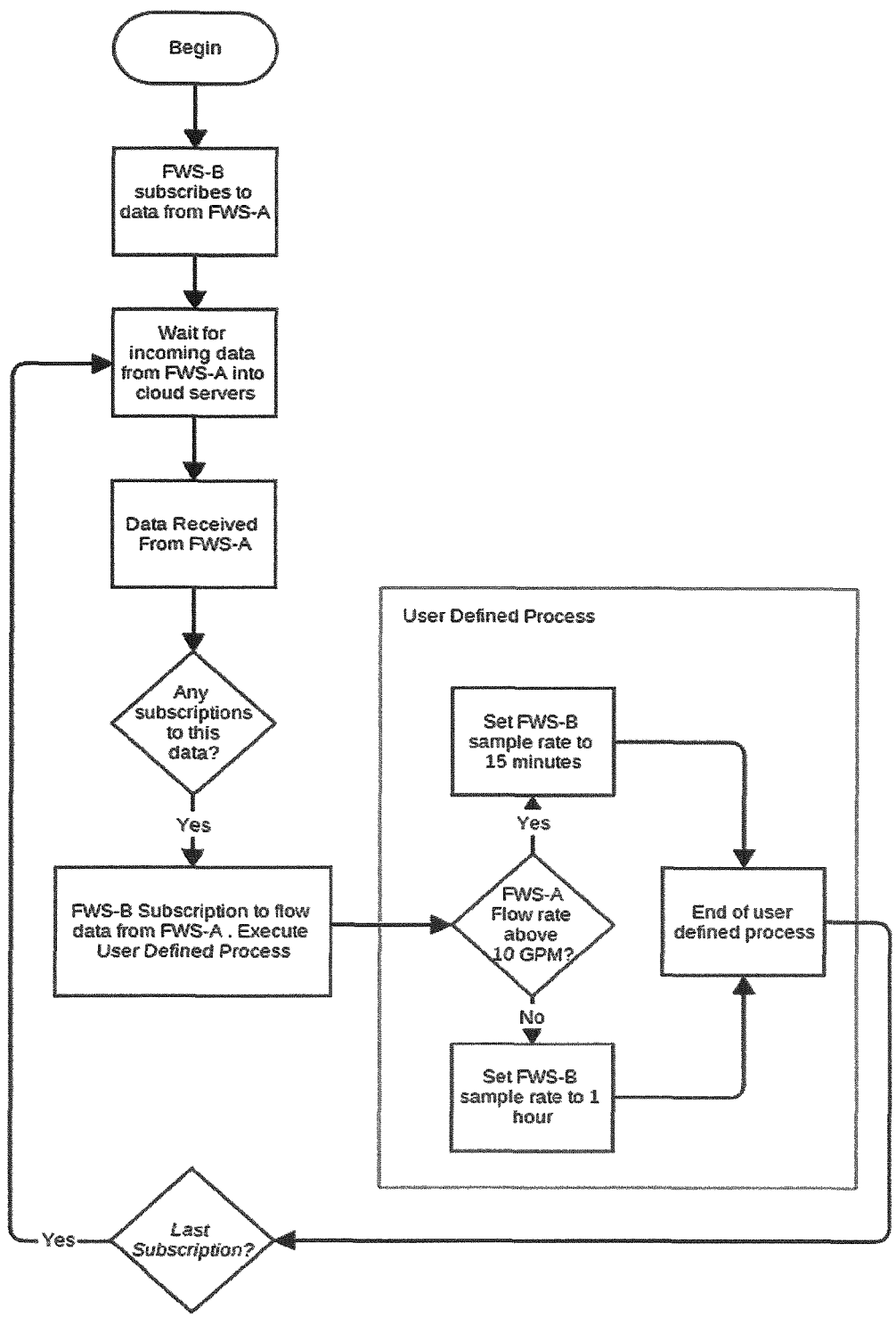
FIG. 28 is a flow chart illustrating an example of active learning and response to transient conditions.

Sampling rate adjustment is another example of active learning and response to transient conditions. FIG. 28 shows FWS-B subscribing to the output of the processed data stream from FWS-A. A user-defined process is set for FWS-B where, if the flow rate at FWS-A is >10 gpm, then the sampling rate at FWS-B is set to 15 minutes, otherwise the sampling ratet is set to 1 hour. This simplified example can be developed into much more complex approaches to optimize sampling rates.

Enrollment Example of a New Sensor Device Using Global Plug & Play:

The following scenario describes a service technician (149) who may want to add a third party flow velocity sensor (112) into an existing flowing water scope (46). The FWS 46 monitored flow using image-based flow width analysis and can be installed in a manhole.

The technician (a person in the field) accesses the FWS 46 in the field and puts it into service mode by connecting to it wirelessly (138) with a smart phone application (150) on a smart phone (49). Part of the process of putting the FWS 46 into service mode and connecting to it involves the technician entering authorization credentials which are verified in the cloud services (48) and on the FWS (step 151). If the technician fails the authentication and authorization process, the FWS at step 151 records a tamper event, sends a notification to the cloud services (step 152) and exits the service mode (step 153). Once properly authenticated, the technician chooses an option in the app to "install a new device" (step 139). The phone app 49 prompts the technician on the scan or enters a unique device address that is associated with the new device (step 140). The phone app 49 then uses this unique device to address the download of appropriate device drivers (step 141) and installs those drivers into the FWS (step 142). The technician then makes the physical connections of the new device to the FWS (step 143). Next, the technician indicates to the phone app that the physical connections have been made and to test the new device (step 144). If the FWS is unable to communicate or detect the new device (step 145) the technician would be notified through the phone app and be prompted to further troubleshoot (step 146). If the device test is successful, the FWS registers the new device with the cloud services as now belonging to its instrument cluster (step 147). Finally, the technician reactivates the FWS that took it out of service mode (step 148) and brings it back into normal operation.

Sensor device manufacturers can register their device type with a neutrally owned "global registrar" that is responsible for handing out unique addresses to manufacturers that link back to the manufacturer's drivers for that device. It is this mechanism that allows device drivers to be downloaded and installed into a Flowing Water Scope.

Application Range of Technology:

The technology spans a range of applications. That is, the technology is not limited to wastewater and stormwater in culverts under a manhole, bit can be used for any quality of water and any water flow scenarios. Manholes are designed as access and connection points for open channel conveyance under gravity drainage. The technology here, including the interposer, the FWS apparatus, and the battery, can be directly applied to monitoring flow in all engineered open-channel conveyances with minor modification to the methodology. Such conveyance includes but is not limited to vertical drainage through drains (FIG. 3) and horizontal drainage through culverts (FIG. 4), sluice channels, weirs, box culverts, flumes, and canals. This direct application of the form and function of the technology to such environments is possible because flow operates under gravity drainage in all of these applications and the geometry of the drainage structured is both well-defined and fixed, as it is in a manhole. Modifications to the methodology only involve simplifications to the deployment. For vertical drains, the method includes a first step when the installer places a riser and cover atop the drain (with the interposer in between the riser and cover); this riser and cover are analogs to a manhole riser and manhole cover. The flow is quantified by the free-space aperture of the vertical drain. The same lighting and monitoring devices are applied here in the same configurations as in a manhole to provide flow information. Flow is quantified as a function of the free-space aperture. High flows will constrict the free space to a smaller diameter than low or no flows. In this case, the data analysis process is dramatically simplified; only the maximum cross sectional area of the drain and the slope of the drain need to be included in metadata. Additionally, in the same way as described for a channel in a manhole, surface velocity can be measured using machine vision, or a well-established flow equation (analogous to Manning's equation) that is defined for horizontal flow into a vertical orifice or weir. The equation is broadly defined as: Discharge (Q), equal to the product of a Coefficient (C), the effective length of the crest (or perimeter) (L), and a power (typically 3/2) of the depth of flow above the elevation of the crest (H). Other equations for orifice flows are well established. If flow is sampled in horizontal canals, channels, or weirs, then the installation methodology is modified to include mounting of the interposer above the horizontal channel. In the case of a trapezoidal culvert or arched culvert (FIG. 4), the FWS is mounted (typically by mounting bolts or screws) above the center of the inlet or the outlet of the culvert (analogous to mounting above the center of the channel in a concentric manhole). In the case of a canal, the interposer is mounted above the side wall of the channel. This is analogous to mounting a FWS in an offset (eccentric manhole). The FWS can be set to sample the area of interest by either facing downstream, upstream, facing directly down on the area of interest, or perpendicular to the stream in the same way as discussed in above FIGS. 1C and 2C). Lastly, the FWS can be set to sample any area of interest between any of the aforementioned spatial orientations and to various angles to the horizon. In the case of a flume or weir, the FWS is typically mounted upstream of the point of constriction, either centered on the inlet (analogous to concentric) or to one side (analogous to offset manhole), facing either downstream to the constriction point or perpendicular to the flow, upstream of the constriction. It can also be placed above the flume but downstream of the constriction such that the monitoring equipment is facing upstream. Lastly, it can be placed above the flume or weir, facing directly down on the area of interest. Orientations can be adjusted to positions not explicitly described here, provided that the area of interest can be quantified as desired by the installer. Flumes and weirs provide a well-known stage discharge relationship based upon the depth of water upstream of the constriction. This can be used to simplify the quantification of discharge wherein only the stage needs to be known at the area of interest in order to quantify flow. The basic equation for a flume is a function of the type of flume being monitored. A Parshall flume equation, for example, is Flow (Q) is equal to the product of a Constant (C), and a power of the depth at the point of measurement (Ha). This equation can be used, similar to Manning's equation, to provide an alternative measure of flow to sampling surface velocity. However, all of the lighting and imaging technologies previously described apply here, as is the need to gather geometry metadata to quantify flow. In this way, for horizontal channels, the only substantial modification to the method described for a manhole is in the installation of the interposer. It should be noted that, while the interposer is not necessarily secured to a ladder rung to prevent drop (as it is in a manhole), it should be secured either above the vertical drain or to a substantial structure in, on, above, or adjacent to a horizontal channel.

The technology can also be applied to natural channels and natural waters such as wetlands, but such systems are subject to Lane's Principle, wherein the stochastic nature of flow affects the scouring and deposition of bed material. This, in turn, changes the discharge characteristics, bed slope, or both discharge and bed slope (where bed is the bottom of the channel or wetland here). Quantification of such systems requires periodic or continuous re-digitization of the bed topography (bathymetry). As such, while the same tools can be used to provide monitoring and quantification of flow and/or water quality, the methodology must be amended to achieve comparable performance to the quantification of conveyance through engineered structures. The methodology would particularly benefit by including a mechanism to repeatedly characterize channel bathymetry. This could be performed, for example, by sending an autonomous floating vessel (equipped with bathymetry mapping equipment, commonly referred to as an "echosounder") across the natural channel at the area of interest to generate and upload channel geometry. Such operations could occur daily or as needed.

Figure 27:
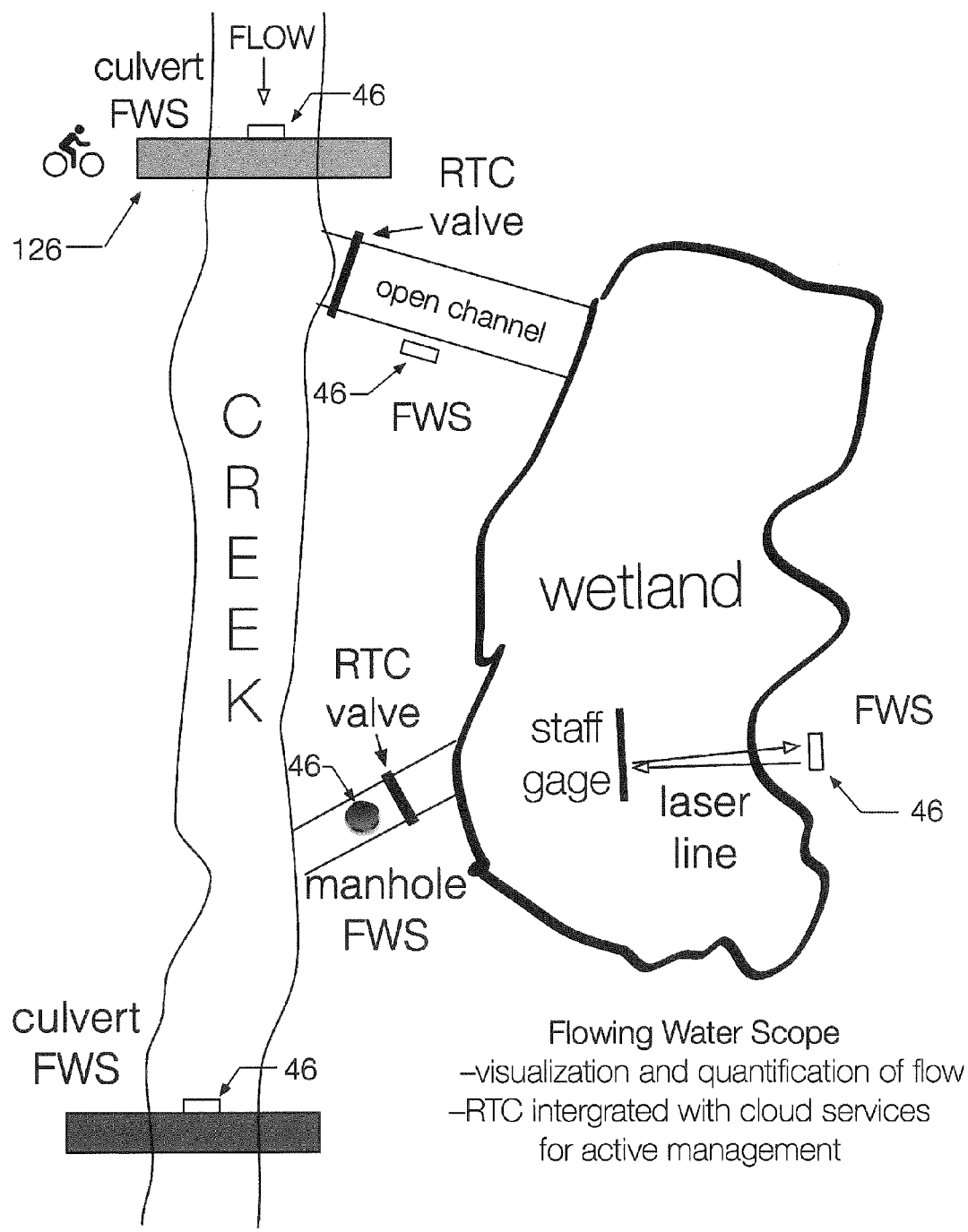
FIG. 27 is a diagram illustrating how the FWS was applied to measure flow at multiple sites in a flood control area.

As one example, FIG. 27 illustrates a 27 acre area where the FWS is applied to measure flow at natural stream culverts, to measure flow in ducted drainage from a wetland, and it is also being applied to measure water level in the wetland (with the use of a line laser and a staff gauge as an aid).

Other examples of FWS application environments include measuring/monitoring level in water supply tanks, reservoirs, and cisterns, and monitoring overland flow (such as over roadway surfaces), and other systems where the water is normally not under pressurized conditions. Additionally slurries and fluidized flows of particles can be monitored using the same technology.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A flow monitoring system comprising:
   an interposer supporting monitoring equipment in a location above water;
   one or more modules monitoring water-generated responses to reflected or transmitted light and/or reflected or transmitted sound at the location;
   a battery pack;
   a data capture, processing, and communication subsystem that renders light and/or sound into interpretable data streams; and
   a data analysis and management subsystem to interpret data streams, wherein:
      the data capture, processing, and communication subsystem interacts with the data analysis and management subsystem,
   the data analysis and management subsystem manages the data capture, processing, and communication subsystem,
   the data analysis and management subsystem is supported by cloud computing, and
   the one or more modules monitoring reflected or transmitted sound provide a signature of the flow throughout the audio spectrum.

2. The system of claim 1, wherein the one or more modules monitoring water-generated responses to reflected or transmitted light further comprise, image sensors, associated optics, processors, memory, communication circuits, and regulated power.

3. The system of claim 1, further comprising one or more modules illuminating water below the location, and wherein the one or more modules illuminating water further comprise an Always On Computer (AOC) that includes a real time clock, and power switches.

4. The system of claim 3, wherein the AOC controls a back-up battery cell bank to ensure longevity of power.

5. The system of claim 3, wherein the AOC further comprises an RGB/iR sensor and/or a sound sensor.

6. The system of claim 1, wherein the battery pack further comprises encapsulated input and output cables, one or more power cells, a microcontroller, a battery pack regulator, and one or more high side power switches.

7. The system of claim 6, wherein the microcontroller controls on-time of the power cells only when needed, maps around dead or faulty cells, re-charges individual power cells, and signals when recharge of the entire battery pack is necessary.

8. The system of claim 1 wherein the location above water is a manhole.

9. The system of claim 8 wherein the interposer is able to be adjusted for a compression fit to the wall of the manhole with or without a seating bracket.

10. The system of claim 8 wherein the one or more modules for illuminating the water can be adjusted to generate various frequencies and wavelengths.

11. The system of claim 8 wherein the one or more modules for monitoring sound, measure reflected sound, transmitted sound, and/or sound generated by the movement of water below the location.

12. The system of claim 1 wherein the modules have support structures, and wherein the support structures for the modules are adjustable to vary pitch, roll, yaw and eccentric offset with respect to the water beneath the location.

13. The system of claim 1 further comprising one or more modules monitoring the thermal image of water beneath the location.

14. A method of flow imaging, monitoring and management of storm water and wastewater comprising:
    placing an interposer supporting, at least one module for monitoring water-generated responses to reflected or transmitted light and/or reflected or transmitted sound, a battery pack, and a data capture, processing, and communication subsystem at a location above flowing water;
    measuring one or more of the width, depth, shape, obstruction and velocity of the water flowing below the location;
    interpreting the water flow characteristics in real time using a data capture, processing and communication subsystem;
    sending the interpretation to a cloud computer;
    and controlling the data capture, processing and communications subsystem from the cloud computer,
    wherein the at least one module monitoring reflected or transmitted sound provides a signature of the flow throughout the audio spectrum.

15. The method of claim 14, wherein the location above water is a manhole, and wherein the interposer supports at least one module for illuminating water flowing at the base of the manhole.

16. The method of claim 14 further comprising interpreting data streams from the modules.

17. The method of claim 14 further comprising a user interface accessing and controlling data aggregation and interpretation software tools from the data capture, processing and communication subsystem.

18. The method of claim 14 wherein the flowing water is obstructed or ponded.

19. A flow monitoring system comprising:
    monitoring equipment placed in a location above water;
    one or more modules monitoring water-generated responses to reflected or transmitted light and/or reflected or transmitted sound at the location;
    a battery pack;
    a data capture, processing, and communication subsystem that renders light and/or sound into interpretable data streams; and
    a data analysis and management subsystem to interpret data streams, wherein:
        the data capture, processing, and communication subsystem interacts with the data analysis and management subsystem,
        the data analysis and management subsystem manages the data capture, processing, and communication subsystem,
        the data analysis and management subsystem is supported by cloud computing, and
        the one or more modules monitoring reflected or transmitted sound provide a signature of the flow throughout the audio spectrum.

* * * * *